US012775851B2

(12) United States Patent
Masse et al.

(10) Patent No.: US 12,775,851 B2
(45) Date of Patent: Oct. 27, 2026

(54) RAPID LEARNING WITH HIGH LOCALIZED SYNAPTIC PLASTICITY

(71) Applicant: THE UNIVERSITY OF CHICAGO, Chicago, IL (US)

(72) Inventors: Nicolas Y. Masse, Cambridge, MA (US); David J. Freedman, Chicago, IL (US); Matthew C. Rosen, Chicago, IL (US)

(73) Assignee: THE UNIVERSITY OF CHICAGO, Chicago, IL (US)

( * ) Notice: Subject to any disclaimer, the term of this patent is extended or adjusted under 35 U.S.C. 154(b) by 789 days.

(21) Appl. No.: 18/138,015

(22) Filed: Apr. 21, 2023

(65) Prior Publication Data

US 2024/0160944 A1 May 16, 2024

Related U.S. Application Data

(60) Provisional application No. 63/335,684, filed on Apr. 27, 2022.

(51) Int. Cl.
*G06N 3/092* (2023.01)
*G06N 3/044* (2023.01)
(Continued)

(52) U.S. Cl.
CPC ............ *G06N 3/092* (2023.01); *G06N 3/044* (2023.01); *G06N 3/0455* (2023.01);
(Continued)

(58) Field of Classification Search
CPC ...... G06N 3/092; G06N 3/0455; G06N 3/047; G06N 3/0464; G06N 3/098; G06N 3/044;
(Continued)

(56) References Cited

PUBLICATIONS

Bellec et al.,("A solution to the learning dilemma for recurrent networks of spiking neurons" Published 2020 by Nature Communication, 15 pages (Year: 2020).*
(Continued)

*Primary Examiner* — Quoc A Tran
(74) *Attorney, Agent, or Firm* — MARSHALL, GERSTEIN & BORUN LLP

(57) ABSTRACT

A method includes selecting artificial neural network parameters; sampling the parameters; selecting connection weights; initializing the artificial neural networks; running the artificial neural networks on cognitive tasks; and determining whether activity is within an acceptable range. A computing system includes a processor; and a memory having stored thereon computer-executable instructions that, when executed by the one or more processors, cause the computing system to select artificial neural network parameters; sample the parameters; select connection weights; initialize the artificial neural networks; run the artificial neural networks on cognitive tasks; and determine whether activity is within an acceptable range. A non-transitory computer-readable medium containing program instructions that when executed, cause a computer to select artificial neural network parameters; sample the parameters; select connection weights; initialize the artificial neural networks; run the artificial neural networks on cognitive tasks; and determine whether activity is within an acceptable range.

18 Claims, 21 Drawing Sheets

(51) Int. Cl.
*G06N 3/0455* (2023.01)
*G06N 3/0464* (2023.01)
*G06N 3/047* (2023.01)
*G06N 3/048* (2023.01)
*G06N 3/0499* (2023.01)
*G06N 3/063* (2023.01)
*G06N 3/084* (2023.01)
*G06N 3/088* (2023.01)
*G06N 3/09* (2023.01)
*G06N 3/098* (2023.01)

(52) U.S. Cl.
CPC ........... *G06N 3/0464* (2023.01); *G06N 3/047* (2023.01); *G06N 3/048* (2023.01); *G06N 3/0499* (2023.01); *G06N 3/063* (2013.01); *G06N 3/084* (2013.01); *G06N 3/088* (2013.01); *G06N 3/09* (2023.01); *G06N 3/098* (2023.01)

(58) Field of Classification Search
CPC ...... G06N 3/048; G06N 3/0499; G06N 3/063; G06N 3/088; G06N 3/09; G06N 3/084
See application file for complete search history.

(56) References Cited

PUBLICATIONS

Song et al.,("Training Excitatory-Inhibitory Recurrent Neural Networks for Cognitive Tasks: A Simple and Flexible Framework" Published 2016 by PLOS Computational Biology, 30 pages (Year: 2016).*

Huang et al.,("Improving Learning Efficiency of Recurrent Neural Network through Adjusting Weights of All Layers in a Biologically-inspired Framework" Published 2017 by IEEE, 7 pages (Year: 2017).*

Yang et al. "Task representations in neural networks trained to perform many cognitive tasks" Published 2019 by Nature Neuroscience, 16 pages (Year: 2019).*

Bellec, G. et al. A solution to the learning dilemma for recurrent networks of spiking neurons. Nature communications 11, 1-15 (2020).

Buckner, R. L. The cerebellum and cognitive function: 25 years of insight from anatomy and neuroimaging. Neuron 80, 807-815 (2013).

Chen, L. et al. The role of intrinsic excitability in the evolution of memory: Significance in memory allocation, consolidation, and updating. Neurobiology of learning and memory 173, 107266 (2020).

Frankle, J. & Carbin, M. The lottery ticket hypothesis: Finding sparse, trainable neural networks. arXiv preprint arXiv:1803.03635 (2018).

Kirkpatrick, J. et al. Overcoming catastrophic forgetting in neural networks. Proceedings of the national academy of sciences 114, 3521-3526 (2017).

Tau, G. Z. & Peterson, B. S. Normal development of brain circuits. Neuropsychopharmacology 35, 147-168 (2010).

Crabtree, G. W. & Gogos, J. A. Synaptic plasticity, neural circuits, and the emerging role of altered short-term information processing in schizophrenia. Frontiers in synaptic neuroscience 6, 28 (2014).

Paoletti, P., Bellone, C. & Zhou, Q. NMDA receptor subunit diversity: impact on receptor properties, synaptic plasticity and disease. Nature Reviews Neuroscience 14, 383-400 (2013).

Nanou, E. & Catterall, W. A. Calcium channels, synaptic plasticity, and neuropsychiatric disease.Neuron 98, 466-481 (2018).

Holtmaat, A. & Svoboda, K. Experience-dependent structural synaptic plasticity in the mammalian brain. Nature Reviews Neuroscience 10, 647-658 (2009).

Humeau, Y. & Choquet, D. The next generation of approaches to investigate the link between synaptic plasticity and learning. Nature neuroscience 22, 1536-1543 (2019).

Tsutsumi, S. & Hayashi-Takagi, A. Optical interrogation of multi-scale neuronal plasticity underlying behavioral learning. Current Opinion in Neurobiology 67, 8-15 (2021).

Hebb, D. O. The organization of behavior: a neuropsychological theory (Science editions, 1949).

Xiong, Q., Znamenskiy, P. & Zador, A. M. Selective corticostriatal plasticity during acquisition of an auditory discrimination task. Nature 521, 348-351 (2015).

Nabavi, S et al. Engineering a memory with LTD and LTP. Nature 511, 348-352 (2014).

Xu, T. et al. Rapid formation and selective stabilization of synapses for enduring motor memories. Nature 462, 915-919 (2009).

Prince, L. Y. et al. CCN GAC Workshop: Issues with learning in biological recurrent neural networks. arXiv preprint arXiv:2105.05382 (2021).

Richards, B. A. et al. Dimensionality and flexibility of learning in biological recurrent neural networks (2020).

Josselyn, S. A. & Tonegawa, S. Memory engrams: Recalling the past and imagining the future. Science 367, eaaw4325 (2020).

Lillicrap, T. P. & Santoro, A. Backpropagation through time and the brain. Current opinion in neurobiology 55, 82-89 (2019).

Payeur, A., Guerguiev, J., Zenke, F., Richards, B. A. & Naud, R. Burst-dependent synaptic plasticity can coordinate learning in hierarchical circuits. Nature neuroscience 24, 1010-1019 (2021).

Schulman, J., Moritz, P., Levine, S., Jordan, M. & Abbeel, P. High-dimensional continuous control using generalized advantage estimation. arXiv preprint arXiv:1506.02438 (2015).

Kingma, D. & Ba, J. Adam: A method for stochastic optimization. arXiv preprint arXiv:1412.6980 (2014).

Heeger, D. J. & Zemlianova, K. O. A recurrent circuit implements normalization, simulating the dynamics of V1 activity. Proceedings of the National Academy of Sciences 117, 22494-22505 (2020).

Pasupathy, A. & Miller, E. K. Different time courses of learning-related activity in the prefrontal cortex and striatum. Nature 433, 873-876 (2005).

Wang, J. X. et al. Prefrontal cortex as a meta-reinforcement learning system. Nature neuroscience 21, 860-868 (2018).

Wang, M. B. & Halassa, M. M. Thalamocortical contribution to solving credit assignment in neural systems. arXiv preprint arXiv:2104.01474 (2021).

Rikhye, R. V., Gilra, A. & Halassa, M. M. Thalamic regulation of switching between cortical representations enables cognitive flexibility. Nature neuroscience 21, 1753-1763 (2018).

Turrigiano, G. G. & Nelson, S. B. Homeostatic plasticity in the developing nervous system. Nature reviews neuroscience 5, 97-107 (2004).

Hensch, T. K. Critical period plasticity in local cortical circuits. Nature Reviews Neuroscience 6, 877-888 (2005).

Mastrogiuseppe, F. & Ostojic, S. Linking connectivity, dynamics, and computations in low-rank recurrent neural networks. Neuron 99, 609-623 (2018).

Schulman, J., Wolski, F., Dhariwal, P., Radford, A. & Klimov, O. Proximal policy optimization algorithms. arXiv preprint arXiv:1707.06347 (2017).

Higgins, I. et al. beta-vae: Learning basic visual concepts with a constrained variational framework (2016).

Miller, E. K., Erickson, C. A. & Desimone, R. Neural mechanisms of visual working memory in prefrontal cortex of the macaque. Journal of neuroscience 16, 5154-5167 (1996).

Song, H. F., Yang, G. R. & Wang, X.-J. Reward-based training of recurrent neural networks for cognitive and value-based tasks. Elife 6, e21492 (2017).

Masse, N. Y., Yang, G. R., Song, H. F., Wang, X.-J. & Freedman, D. J. Circuit mechanisms for the maintenance and manipulation of information in working memory. Nature neuroscience 22, 1159-1167 (2019).

Yang, G. R., Joglekar, M. R., Song, H. F., Newsome, W. T. & Wang, X.-J. Task representations in neural networks trained to perform many cognitive tasks. Nature neuroscience 22, 297-306 (2019).

(56) References Cited

PUBLICATIONS

Mohan, K., Zhu, O. & Freedman, D. J. Interaction between neuronal encoding and population dynamics during categorization task switching in parietal cortex. Neuron 109, 700-712 (2021).
Freedman, D. J. & Assad, J. A. Experience-dependent representation of visual categories in parietal cortex. Nature 443, 85-88 (2006).
Lillicrap, T. P., Santoro, A., Marris, L., Akerman, C. J. & Hinton, G. Backpropagation and the brain. Nature Reviews Neuroscience 21, 335-346 (2020).
Whittington, J. C. & Bogacz, R. Theories of error back-propagation in the brain. Trends in cognitive sciences 23, 235-250 (2019).
Maass, W., Natschläger, T. & Markram, H. Real-time computing without stable states: A new framework for neural computation based on perturbations. Neural computation 14, 2531-2560 (2002).
Jaeger, H. The "echo state" approach to analysing and training recurrent neural networks-with an erratum note. Bonn, Germany: German National Research Center for Information Technology GMD Technical Report 148, 13 (2001).
Masse, N. Y., Grant, G. D. & Freedman, D. J. Alleviating catastrophic forgetting using contextdependent gating and synaptic stabilization. Proceedings of the National Academy of Sciences 115, E10467-E10475 (2018).
Zenke, F., Poole, B. & Ganguli, S. Continual learning through synaptic intelligence in International Conference on Machine Learning (2017), 3987-3995.

* cited by examiner

200

500

510

520

530

540

550

600

700

710

800

910

900

920

RAPID LEARNING WITH HIGH LOCALIZED SYNAPTIC PLASTICITY

CROSS-REFERENCE TO RELATED APPLICATION

This application claims the benefit of U.S. Provisional Patent Application No. 63/335,684, filed Apr. 27, 2022, which is incorporated by reference herein in its entirety.

STATEMENT REGARDING FEDERALLY-SPONSORED RESEARCH OR DEVELOPMENT

This invention was made with government support under grant number N00014-19-1-2001 awarded by the Office of Naval Research. The government has certain rights in the invention.

TECHNICAL FIELD

The present disclosure is generally directed to methods and systems for rapid learning with highly localized synaptic plasticity, and more particularly, for implementing rapid multitask learning in recurrent artificial neural network models with minimal and highly-localized synaptic plasticity in a biologically-plausible manner using various learning techniques.

BACKGROUND

During development, an intricate and tightly-controlled set of cellular and molecular processes governs the formation of neural circuits. One such process, synaptic plasticity, which regulates the connection strength between pre- and post-synaptic neurons, is critical for properly determining how information flows in neural circuits and the computations the circuit performs. Disrupting the genetic or biochemical pathways involved in synaptic plasticity is associated with a myriad set of diseases and dysfunctions. Synaptic plasticity during development is essential for the proper function and survival of most vertebrates.

While the importance of synaptic plasticity during development is undisputed, its role in the adult brain has not been explored, largely because monitoring synapses in vivo is technically challenging, and it is currently not feasible to directly measure synaptic connections throughout the brain across the longer time scales of many forms of learning. As a result, many questions regarding the role of synaptic plasticity in the adult brain are left unanswered. For example, how does synaptic plasticity support a biological actor's ability to learn a new task?

While Hebb first proposed the link between synaptic plasticity and learning over 70 years ago, only recently have studies documented how specific synaptic connections are altered for specific tasks. In view of sparse experimental results, it is still not clear how widely synaptic plasticity occurs, during which kinds of learning/tasks synaptic plasticity occurs, and in what areas of the brain. It is not currently known to what degree networks need to be plastic in order to support learning. For example, it is not currently known whether, when one learns a perceptual decision task, learning alters synaptic connections along the entire motor-sensory hierarchy, or whether the synaptic connections composing such networks are more rigid, with synaptic plasticity being restricted to localized parts of the brain.

Just as Hebb's rule originated as a theory, inspired by the appreciation of neural circuit architecture and anatomy, modern studies of the principles by which experience shapes neural circuit function are also facilitated by theoretical investigations. In particular, biologically-inspired RNNs, trained using backpropagation through time, can learn complex tasks, and offer the opportunity for detailed examination of network activity and circuit structure that support performance of learned tasks. Conventional training of RNNs using backpropagation through time is performed by treating all synapses as plastic, maximizing network flexibility.

However, there are reasons to believe that biological brains may function differently. First, experimental evidence suggests that only a small subset of neurons are able to participate in memory formation at any one time. Second, experiments further show that in the adult brain, neural representations in cortical areas closer to sensory input remain more fixed during learning compared to those in association cortex. Third, despite many theoretical advances, implementing backpropagation throughout the entire brain through time would be challenging for biological circuits to implement. Last, learning tasks sequentially can cause interference between synaptic weights learned for different tasks, leading to catastrophic forgetting.

Thus, improved machine learning methods are needed, that address the efficiency, flexibility and robustness problems attendant to conventional techniques.

BRIEF SUMMARY

In one aspect, a computer-implemented method for training one or more artificial neural networks capable of rapidly solving tasks with constrained plasticity includes (i) selecting, via one or more processors, a set of artificial neural network parameters; (ii) sampling the network parameters from a uniform distribution with defined ranges; (iii) selecting connection weights for one or more artificial neural networks; (iv) initializing the one or more artificial neural networks using the network parameters and connection weights; (v) running the artificial neural networks on a series of trials of cognitive tasks; and (vi) determining whether activity of each of the artificial neural networks is within an acceptable range.

In another aspect, a computing system includes one or more processors; and one or more memories having stored thereon computer-executable instructions that, when executed by the one or more processors, cause the computing system to: (i) select, via one or more processors, a set of artificial neural network parameters; (ii) sample the network parameters from a uniform distribution with defined ranges; (iii) select connection weights for one or more artificial neural networks; (iv) initialize the one or more artificial neural networks using the network parameters and connection weights; (v) run the artificial neural networks on a series of trials of cognitive tasks; and (vi) determine whether activity of each of the artificial neural networks is within an acceptable range.

In yet another aspect, a non-transitory computer-readable medium containing program instructions that when executed, cause a computer to: (i) select, via one or more processors, a set of artificial neural network parameters; (ii) sample the network parameters from a uniform distribution with defined ranges; (iii) select connection weights for one or more artificial neural networks; (iv) initialize the one or more artificial neural networks using the network parameters and connection weights; (v) run the artificial neural networks on a series of trials of cognitive tasks; and (vi) determine whether activity of each of the artificial neural networks is within an acceptable range.

BRIEF DESCRIPTION OF THE FIGURES

The figures described below depict various aspects of the system and methods disclosed therein. It should be understood that each figure depicts one aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

Figure 1:
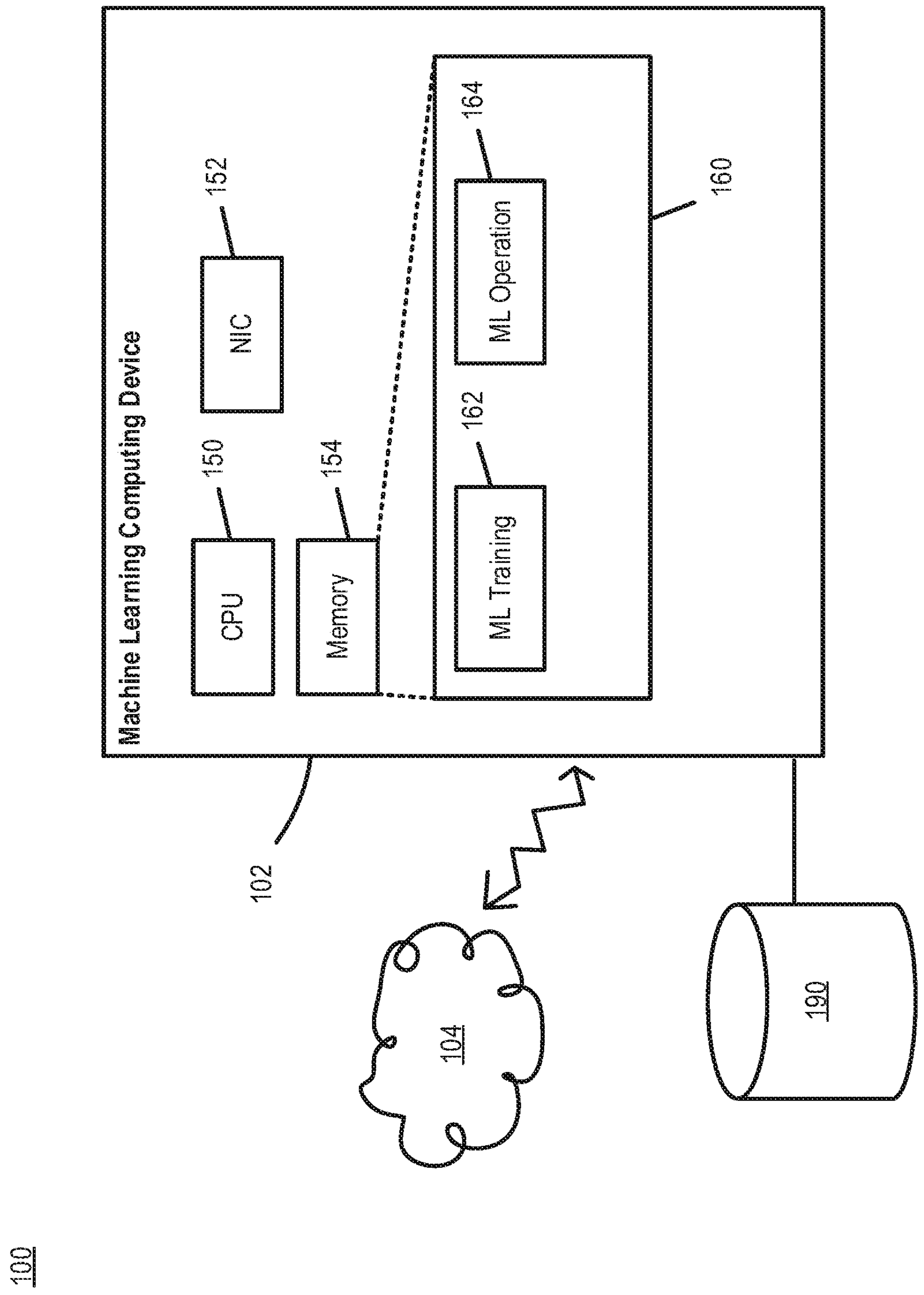
FIG. 1 depicts an exemplary computing environment for implementing rapid learning with highly localized synaptic plasticity, according at some aspects.

The figures depict preferred aspects for purposes of illustration only. One skilled in the art will readily recognize from the following discussion that alternative aspects of the systems and methods illustrated herein may be employed without departing from the principles of the invention described herein.

DETAILED DESCRIPTION

Overview

The present techniques provide methods and systems for, inter alia, rapid learning with highly localized synaptic plasticity. For example, the present techniques include aspects directed to identifying artificial neural network parameters that perform a task, and selecting top-performing artificial neural networks by comparing task-based accuracy. The present techniques may employ reinforcement learning to advantageously avoidance computationally-expensive backpropagation.

The present techniques include computational and circuit principles that allow for more efficient, flexible and robust learning, more closely resembling biological brain learning. Drawing inspiration from earlier generations of recurrent neural network (RNN) models such as echo state networks, liquid state machines and later variants such as FORCE training, the present techniques include rapid and robust multitask learning using RNNs in which synaptic plasticity is constrained to be sparse and highly localized, rather than relying on widespread changes in synaptic weights throughout the network during training. Specifically, the present techniques may include intentionally constraining training of connections to an output layer of an artificial neural network (ANN) and in a top-down layer of the ANN that linearly transforms the task context. This top-down layer may project onto the RNN, altering the neural dynamics of the RNN, and allowing the RNN to flexibly perform multiple tasks involving working memory, decision making, and categorization.

The present techniques may include identifying specific combinations of network property parameters (e.g., control topology, normalization, etc.) that produce RNNs capable of rapid learning. Not all combinations produce RNNs that are capable of rapid learning. The present techniques may include learning strategies performed with purely local reward signals using a reinforcement learning setup between two cooperating actors, eliminating the need to backpropagate error signals through the entire network and through time, which may be challenging to implement in biological circuits. The present techniques include biologically-plausible learning that supports rapid multitask learning with sparse and localized synaptic changes.

The present techniques include machine learning techniques and algorithms that may be implemented in hardware, in some aspects. For example, one of the networks found to perform well for a given task may be implemented as a neuromorphic chip (e.g., an ASIC, field programmable neural array, CMOS/transistor-based chip, etc.). Thus, the present techniques include advantageous improvements to the structure and functioning of the technology/technical field of artificial neural network algorithms and/or the functioning of a computer.

The present techniques indicate that rapid multitask learning can be accomplished despite limiting synaptic changes to highly localized sections of an artificial neural network, the output and top-down layers, comprising, for example, 0.1% of all network connections. The present techniques may include generating many (e.g., thousands or more) different RNNs, each with a different combination of network properties that control topology, normalization, etc., and trialing each of them to determine which of these RNNs with specific network properties are capable of rapidly learning all tasks.

The present techniques further demonstrate that RNNs generated using these high-performing network properties can reliably solve all tasks, and can generalize to novel tasks. To demonstrate that this form of learning may be readily implemented in biological circuits, the present techniques further include modifying the learning algorithms disclosed herein to use only local error signals (i.e., no backpropagation through hidden layers), using a reinforcement learning setup involving two cooperating actors. This biologically-plausible learning algorithm allows RNNs with high-performing network properties to learn all tasks, and can even generalize to feedforward networks trained on games (e.g., the Atari game Space Invaders). The results of the present techniques demonstrate that biologically-inspired artificial networks, and potentially biological agents, are capable of rapidly learning multiple tasks with highly localized synaptic plasticity in a biologically-plausible manner.

The present techniques further demonstrate that that random, fixed-connection RNNs are capable of solving complex tasks, provided 1) that the RNNs are correctly initialized and 2) learning a task-dependent signal (e.g., a single linear transformation) that projects onto the recurrent layer, allowing it to flexibly switch between tasks. Crucially, the present techniques demonstrate that this task-dependent signal can be learned in a biologically-plausible manner using only local error signals by structuring a neural network as a system of two interacting actors trained using reinforcement learning. Thus, the present techniques improve upon echo state networks or liquid state machines, which perform at a level below that of RNNs trained using backpropagation that could flexibly adjust all connection weights, and can only be trained using supervised learning, limiting their use to cases where a teaching signal is provided. The present techniques also improve upon a later technique, FORCE training.

Learning new tasks with limited synaptic plasticity depends upon proper initialization of the network. This tentatively suggests that one important role of neurodevelopment is the correct wiring of neural circuits so that they can learn future tasks with relatively rigid synaptic connections. Specifically, one hypothesis is that synaptic plasticity, along with other molecular and cellular processes, initializes neural circuits to properly process and transmit information, allowing them to innately perform various computations without the need to alter synaptic connections. Future work could build upon our growing understanding of circuit development in biological networks, and determine whether RNNs "wired" with the same logic as used in their biological counterparts can learn to perform similar tasks. Future work may also focus on the link between neural dynamics and synaptic plasticity in the network models of the present techniques.

In this study, the learned top-down signal that biases the recurrent layer plays a role similar to one hypothesized for subcortical circuits, such as the thalamus and the cerebellum. Recent experimental studies have shown that the mediodorsal thalamus can encode the current behavioral context, allowing prefrontal cortex to flexibly switch representations during different contexts. This might suggest that when confronted by new tasks, contexts or environments, synaptic plasticity might (initially) be located primarily in subcortical circuits to facilitate rapid learning, consistent with experimental evidence. Although the network architecture in the present techniques only approximates the role of the thalamus, it may be that by drawing inspiration from the various roles of subcortical circuits, the present techniques may be used to build artificial neural networks that better approximate the ability of humans and advanced animals to seamlessly switch between different contexts.

The present techniques demonstrate that networks can rapidly learn multiple tasks despite limiting synaptic changes to the output and top-down layers (comprising 0.1% of network connections), in a biologically-plausible manner. The present techniques include biologically-inspired machine learning models that may continue to rapidly generate new hypotheses about neural circuits found in vivo, as well as test their plausibility. The close interplay between computational and experimental work in artificial networks as well as experimental model organisms provides a catalyst for novel biological insights, which in turn provide inspiration to create novel machine learning algorithms.

Exemplary Computing Environment

FIG. 1 depicts an exemplary computing environment 100 in which the techniques disclosed herein may be implemented, according to an aspect. The environment 100 includes a machine learning computing device 102, a network 104 and a database 106. Some aspects may include a plurality of client computing devices 102 and/or a plurality of servers 104. The machine learning computing device 102 may access one or more client computing devices (not depicted). The one or more client computing devices may be individual servers, a group (e.g., cluster) of multiple servers, or another suitable type of computing device or system (e.g., a collection of computing resources). For example, the client computing device may be any suitable computing device (e.g., a server, a mobile computing device, a smart phone, a tablet, a laptop, a wearable device, etc.). In some aspects, one or more components of the computing device may be embodied by one or more virtual instances (e.g., a cloud-based virtualization service). In such cases, one or more client computing device 102 may be included in a remote data center (e.g., a cloud computing environment, a public cloud, a private cloud, etc.).

The network 106 may be a single communication network, or may include multiple communication networks of one or more types (e.g., one or more wired and/or wireless local area networks (LANs), and/or one or more wired and/or wireless wide area networks (WANs) such as the Internet). The network 106 may enable bidirectional communication between the client computing device(s) and the machine learning computing device 104.

The machine learning computing device 102 includes a processor 150 and a network interface controller (NIC) 152. The machine learning computing device 102 may further include a database 190. The database 190 may be a structured query language (SQL) database (e.g., a MySQL database, an Oracle database, etc.) or another type of database (e.g., a not only SQL (NoSQL) database). The machine learning computing device 102 may include a library of client bindings for accessing the database 190. In some aspects, the database 190 is located remote from the machine learning computing device 102. For example, the database 190 may be implemented using a remote database API, in some aspects.

The processor 150 may include any suitable number of processors and/or processor types, such as CPUs and one or more graphics processing units (GPUs). Generally, the processor 150 is configured to execute software instructions stored in a memory 154. The memory 154 may include one or more persistent memories (e.g., a hard drive/solid state memory) and stores one or more set of computer executable instructions/modules 160, including a machine learning training module 162 and a machine learning operation module 164. Each of the modules 160 implements specific functionality related to the present techniques. More or fewer modules may be included in the module 160, in some aspects.

In operation, the ML training module 162 may train one or more machine learning models (e.g., one or more ANNs, one or more RNNs, etc.) as discussed herein. The ML training module 162 may load an ANN and training data, e.g., from the database 190. The ML training module may process the training data using the loaded ANN, and update weights. The values of the weights may be saved, e.g., to the database 190 for later use in parameterizing the ANN. In some aspects, the ML operation module 164 may include instructions for randomizing parameters and testing multiple sets of randomized parameters, to generate many (e.g., thousands or more) trained RNNs. The ML operation module 164 may include further instructions for operating each of these trained RNNs (e.g., in parallel) to determine the performance of each one, as discussed below, with respect to one or more tasks. The ML operation module 164 may load the one or more tasks by accessing the database 190. The ML operation module 164 may output results of each network to the database 190. In some aspects, a ranking module may be included in the modules 160 that evaluates the independent operation of each of the trained ML models/neural networks. Training and operation of ANNs (including RNNs, reinforcement learning, etc.) is discussed further below.

Exemplary Training Images

Figure 2:
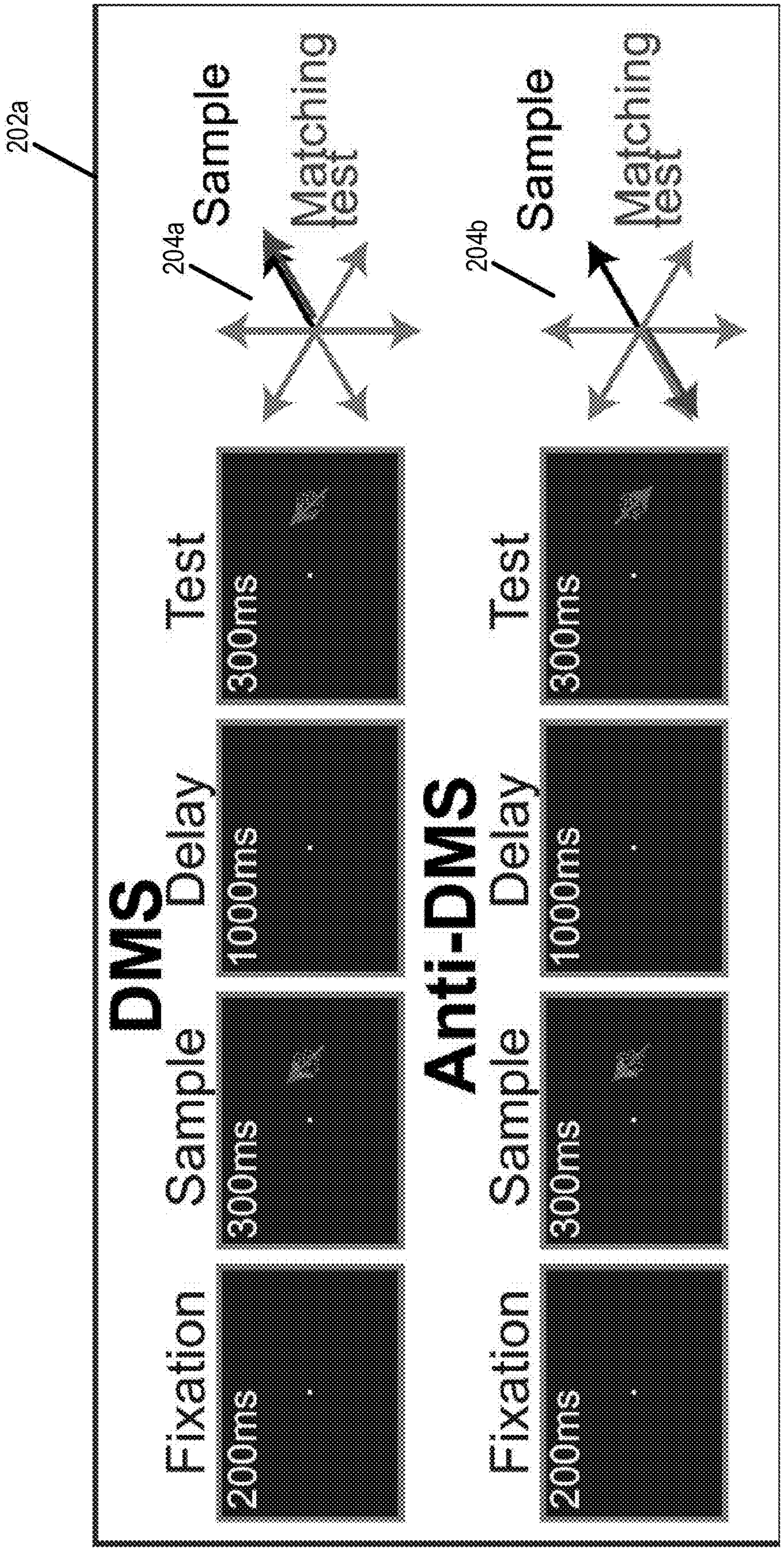
FIG. 2 depicts motion direction graphs generated while training artificial neural networks to learn tasks, according to some aspects.
Figure 2:
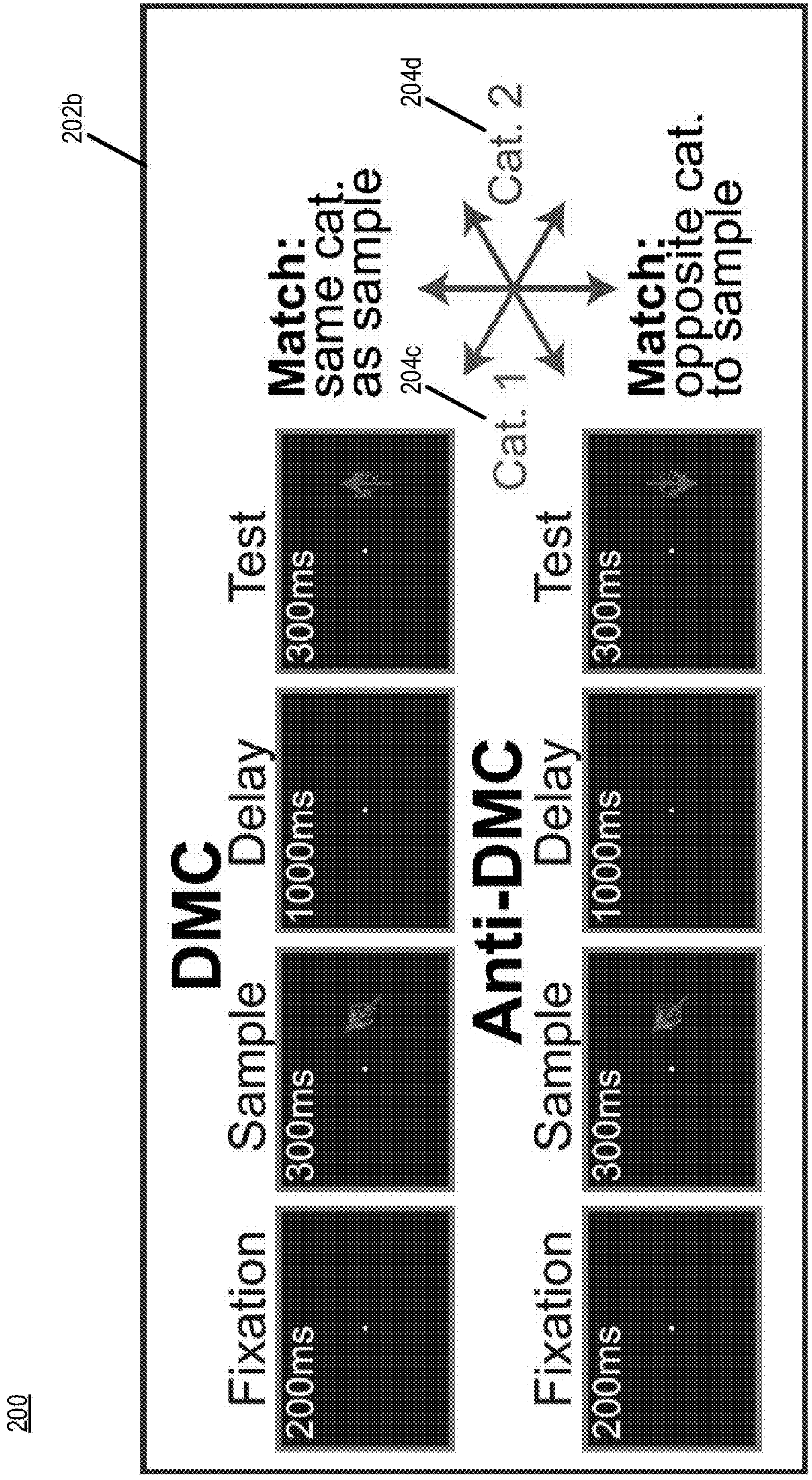
Figure 2:
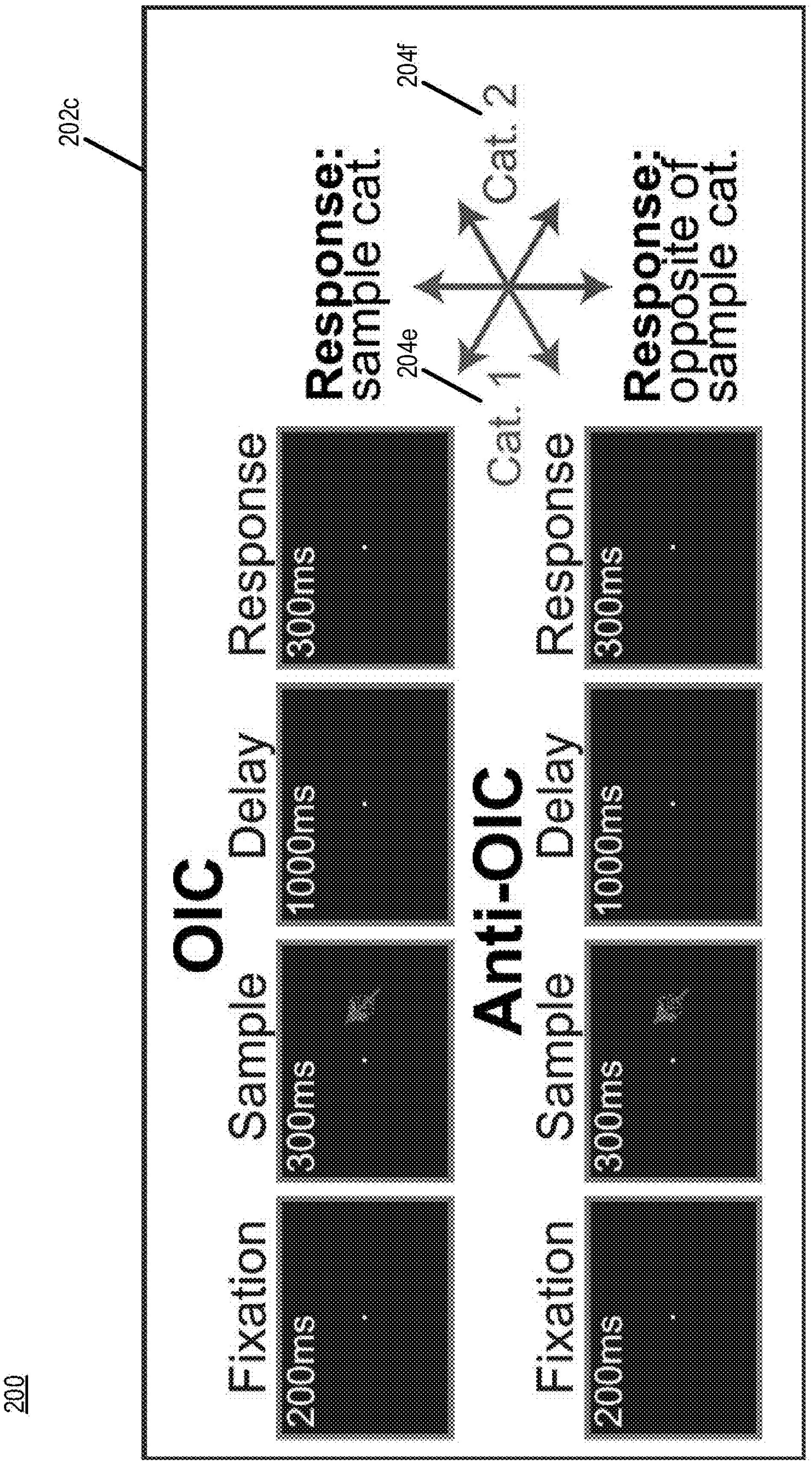

FIG. 2 depicts motion direction graphs 200 generated while training artificial neural networks to learn cognitive tasks, according to some aspects. The motion direction graphs 200 include a graph 202*a*, depicting a delayed match-to-sample (DMS) task and an anti-DMS task. In this case, the network was rewarded for indicating whether a test stimulus direction matched (or was 180° away from) the sample stimulus direction, as indicated, respectively by the reference numerals 204*a* and 204*b*.

The motion direction graphs 200 include a graph 202*b*, depicting a delayed match-to-category (DMC) task and an anti-DMC task. In this case, the network was rewarded for indicating whether the sample direction belonged to the same (or opposite) category as the test direction. The same and opposite categories are indicated by reference numerals 204*c* and 204*d*, respectively.

The motion direction graphs 200 include a graph 202*c*, depicting a one interval category (OIC) task and an anti-OIC task. In this case, the network was rewarded for indicating which category the sample stimulus belonged to. The correct response for the OIC task was opposite that for the anti-OIC task, as indicated by the reference numerals 204*e* and 204*f*, respectively.

The graphs 200 may be generated by implementing rapid multitask learning in recurrent artificial neural network models with minimal and highly-localized synaptic plasticity. In particular various learning technique may be used, including supervised learning and more biologically-plausible techniques (e.g., reinforcement learning) using only local reward signals.

In the example of FIG. 2, a number of tasks (e.g., six tasks) used in cognitive and systems neuroscience experiments are used to train one or more networks (e.g., using the ML training module 164). The stimulus in the tasks is visual motion detection, presented in one of six directions. In some aspects, the tasks may be learned simultaneously (e.g., using parallel cores of the CPU 150). In each of the tasks, the network may be required to maintain "fixation" before selecting the correct action during the test period. The identity of each task may be cued to the network. To select the correct action during any task, the networks may need to maintain and manipulate information in working memory, in some cases to group stimuli into categories, and to determine whether the stimuli matched. Importantly, the stimuli may be similar across tasks, but the required actions may differ, enabling the network to utilize the task identity to correctly respond. It will be appreciated by those of ordinary skill in the art that more or fewer tasks may be used for training, in some aspects.

The present techniques include biologically-plausible networks that may include several layers, as discussed below.

Exemplary Network Model Training

Figure 3A:
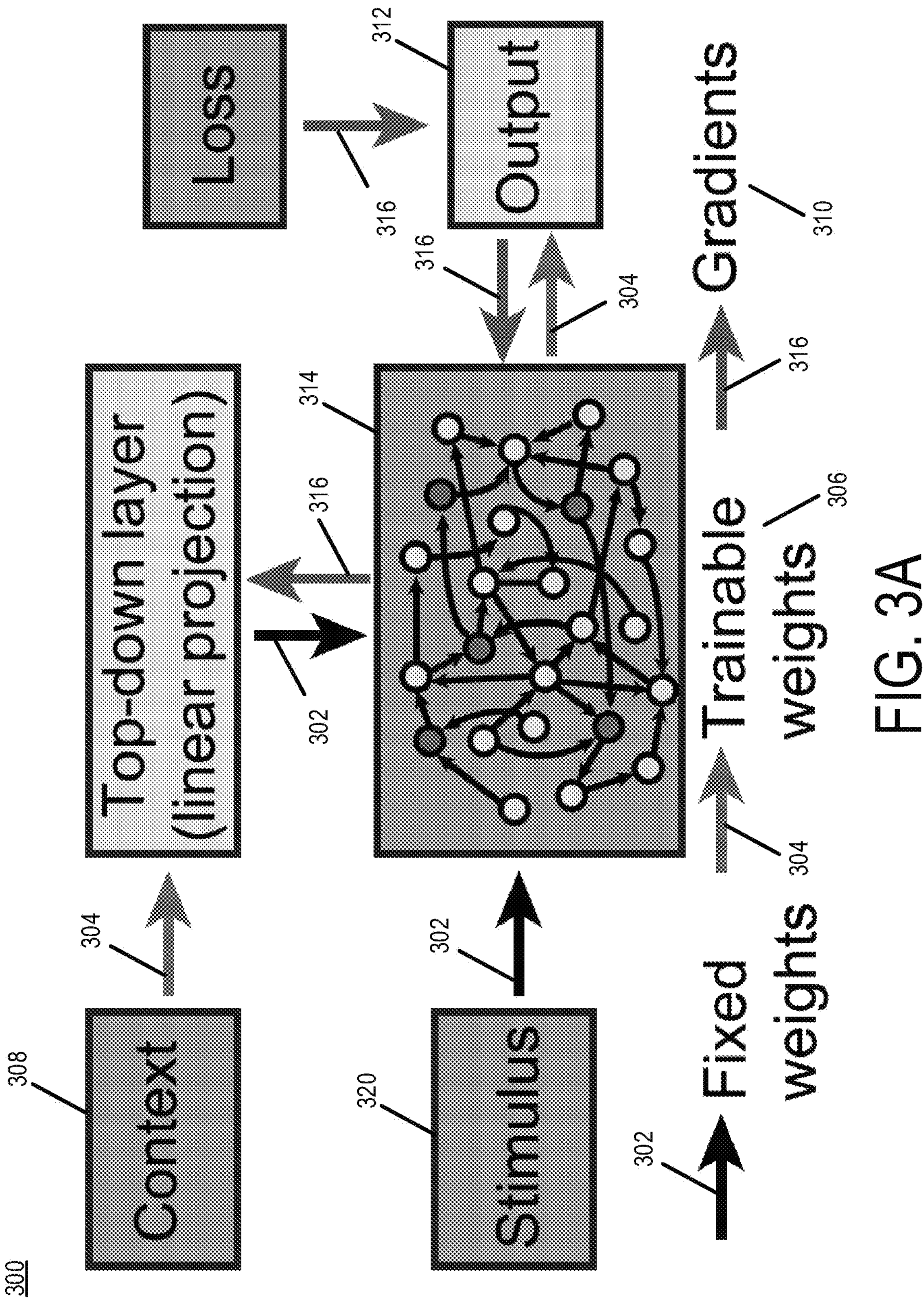
FIG. 3A depicts an exemplary artificial neural network architecture for learning cognitive tasks, according to some aspects.

FIG. 3A depicts an exemplary artificial neural network architecture 300 for the network used to learn the cognitive tasks of the motion direction graphs 200 of FIG. 2, according to some aspects. The network architecture 300 includes several modules whose weights were fixed (denoted by the reference numerals 302) and several modules whose weights were trainable (denoted by the reference numerals 304). The present techniques may include training weights 306 of a context module 308 of the ANN architecture 300 by propagating gradients 310 from an output module 312 of the ANN architecture via a recurrent network 314 of the ANN architecture (via the arrows indicated by reference numerals 316). FIG. 3A may include a stimulus layer 320.

The present biologically-inspired networks may include several layers, as shown in FIG. 3A. In some aspects, weight changes may be limited to the output layer(s) 312 and the top-down layer(s) that linearly transform the task identity. The results observed during this intentional limiting may be indicative of whether the network can rapidly learn multiple tasks with localized synaptic changes (e.g., as depicted by the references 304 of FIG. 3). The weights in all other layers may be kept fixed and not adjusted during training, as depicted by the reference numerals 302 of FIG. 3A. For example, the learnable weights may comprise 0.1% of all network parameters. Training may still require backpropagation through time and through hidden layers, as the gradient of the loss needed to propagate through the recurrent layer (e.g., as depicted in reference numerals 316 of FIG. 3A). Training without backpropagation is discussed further below.

In some aspects, an ANN having a particular architecture (e.g., the architecture 300 of FIG. 3A) may be trained. For example, the ANN may be trained using the machine learning framework Tensor-Flow or another library/application programming interface. A programming language (e.g., Python, JavaScript, Ruby, Perl, LISP, etc.) may be used to access the machine learning framework. The network architecture including its layers and the respective connections between the layers may reflect that of the architecture 300 or may differ, in some aspects. In some aspects, the ANNs disclosed herein (e.g., one or more RNNs) may be rate-based, biologically-inspired RNN models. Units in these networks may obey Dale's principle (i.e., either excite or inhibit all of their postsynaptic partners) and take on strictly positive, non-saturating activities obtained by the ReLU activation function.

The stimulus layer(s) 320 of FIG. 3A may include one or more (e.g., 64 or more) motion-direction tuned neurons and one fixation tuned neuron. The tuning of the motion direction selective neurons may follow a von Mises distribution, such that the activity of the input neuron i was $$u_i = A \exp \kappa(\theta - \theta_i)$$

where θ was the direction of the motion stimulus, $\theta_i$ was the preferred direction of the neuron, κ was set to 2, and A was set to 2 when the motion direction stimulus was on (e.g., during sample and test periods) and set to 0 otherwise. The activity of the fixation neuron may be set to 4 when the fixation cue was on (e.g., during the fixation, sample and delay period) and 0 when the fixation cue was off (e.g., during the test/response period). These input weights may be fixed (i.e., not trained) and projected onto half of the neurons in the recurrent layer. The context layer(s) 308 may include. These input weights may be fixed (i.e., not trained) and projected onto half of the neurons in the recurrent layer.

The context layer(s) 308 may include a number of neurons (e.g., six) encoding a number of tasks (e.g., six tasks as in the example of FIG. 3A). The context layer 308 may further include one or more neurons encoding the tasks (e.g., using one-hot encoding). These neurons (e.g., six neurons) may be projected onto a vector (e.g., a 64-dimensional vector) via a trainable linear projection. This vector may then be projected onto half of the neurons in the recurrent network 314 (the other half than those receiving input projections). The projections onto the recurrent layer(s) may be fixed. The recurrent network 314 may include a number (e.g., 2000) of excitatory neurons and a number (e.g., 500) of inhibitory neurons. To make it more challenging to maintain information in short-term memory, no short-term synaptic plasticity, or firing rate adaptation may be used.

Figure 3B:
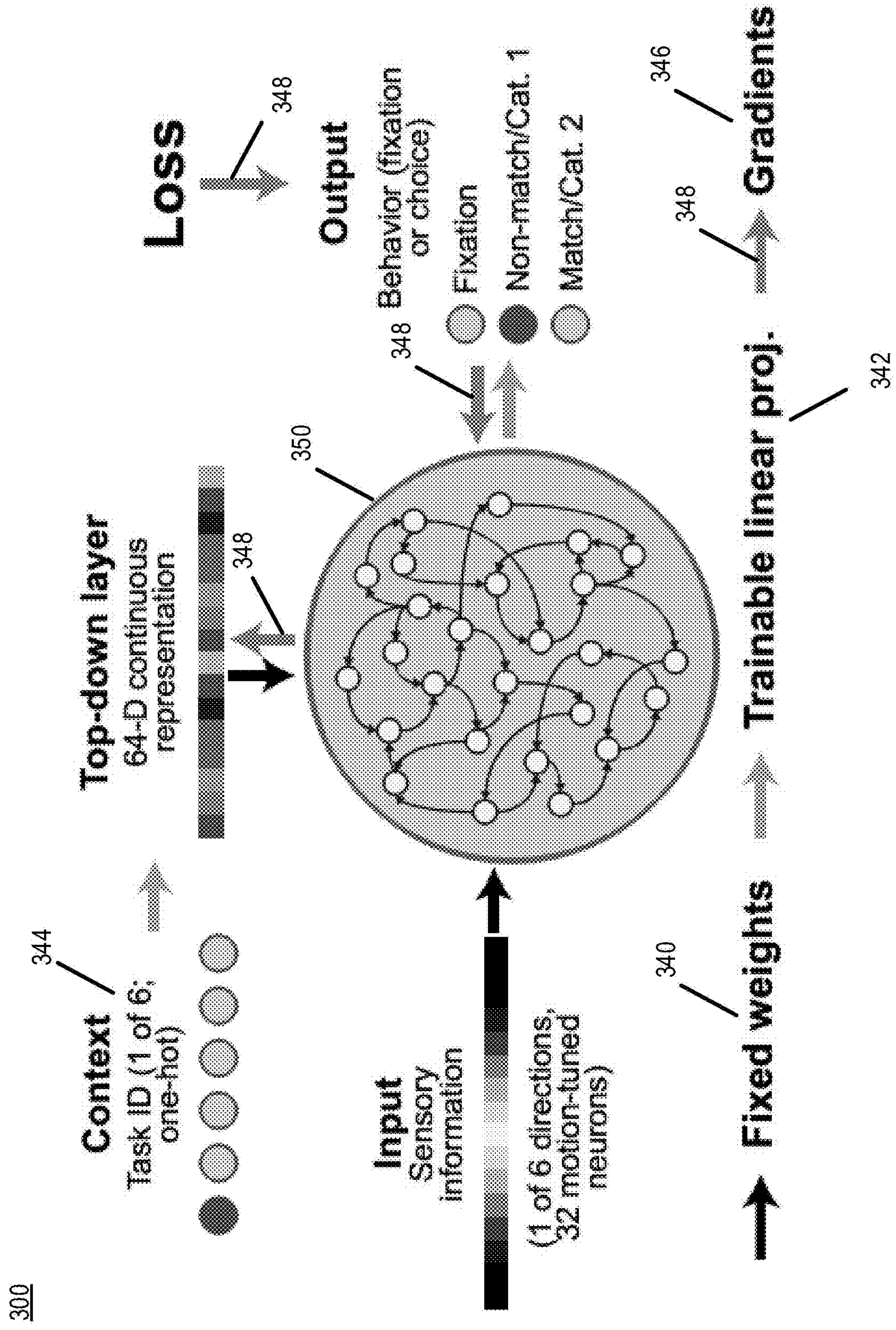
FIG. 3B depicts an alternative view of the exemplary artificial neural network FIG. 3A, according to some aspects.

FIG. 3B depicts an alternative view of the exemplary artificial neural network 300 FIG. 3A, according to some aspects. In FIG. 3B, the network 300 is depicted as including one or more modules/layers 340 whose weights are fixed, and one or more trainable modules/layers 342 whose weights are trainable. Training the trainable weights 342 from one or more context modules/layer(s) 344 may require backpropagating one or more gradients 346 along a recurrent backpropagation path, as depicted by reference numerals 348, through one or more recurrent neural network layers 350.

Exemplary Cognitive Task Training

The network depicted in FIG. 3A may be trained to perform two sets of tasks—the first comprising, for example, six cognitive tasks, all sharing a common temporal structure, and the second two "challenge" tasks with longer temporal dependencies. All tasks may include the same core epochs: fixation, sample, delay, and test. The task inputs/outputs may be network decisions (e.g., the category of the sample stimulus, or whether sample/test stimuli match). These decisions may be read out during a test period. The networks may be expected to maintain fixation during all other epochs, and may be instructed to do so by a constant and generic fixation-tuned input. Rule cues, one-hot inputs that identify the current task, may be presented for the duration of each trial. Herein, the number of tasks may be represented by "T." It will be appreciated that more or fewer tasks may be chosen, in some aspects.

Regarding task timing, each task may begin with a fixation epoch, during which networks are expected to begin maintaining fixation. After fixation, the initial stimulus or stimuli that the network will need to process and maintain in order to eventually generate the correct behavioral response may be presented. Sample presentation may be followed first by a stimulus-free delay epoch and then by a test epoch, during which any additional stimulus needed to generate the appropriate response may also be presented. The main tasks (e.g., seven of them) may have only one delay period and one test period, while the challenge tasks may have three delay/test periods. Below, each task's specific design is described.

In delayed match-to-sample (DMS) task type, networks must indicate whether the initial sample stimulus (e.g., one of 6 motion directions) is an identical match to the direction presented during the test period. For the anti-DMS task, the networks must indicate whether the test stimulus was 180° rotated from the sample. In the delayed match-to-category (DMC) task type, networks must indicate whether the sample stimulus is a categorical match to the direction presented during the test period. Stimulus categories may be determined by grouping the directions into two equal-size, contiguous zones (e.g. 0-180 degrees=category 1, 180-360 degrees=category 2). For the anti-DMC task, the networks must indicate whether the sample and test categories did not match (i.e. the correct response for the DMC and anti-DMC was reversed). For the one interval category (OIC) task type, the networks must indicate whether the sample stimulus belonged to category 1 or category 2. For the anti-OIC task, the correct response was reversed. For the A-B-B-A and A-B-C-A task type, discussed below, in both tasks, a sample stimulus was followed by three sequentially presented test stimuli, and the network had to indicate whether each test matched the sample. In the A-B-B-A task, if a test stimulus was a non-match, there was a 50% probability that the test would be repeated immediately. In the A-B-C-A task, non-matching test stimuli were never repeated during a single trial.

Exemplary Computer-Implemented Initialization Method

Figure 4:
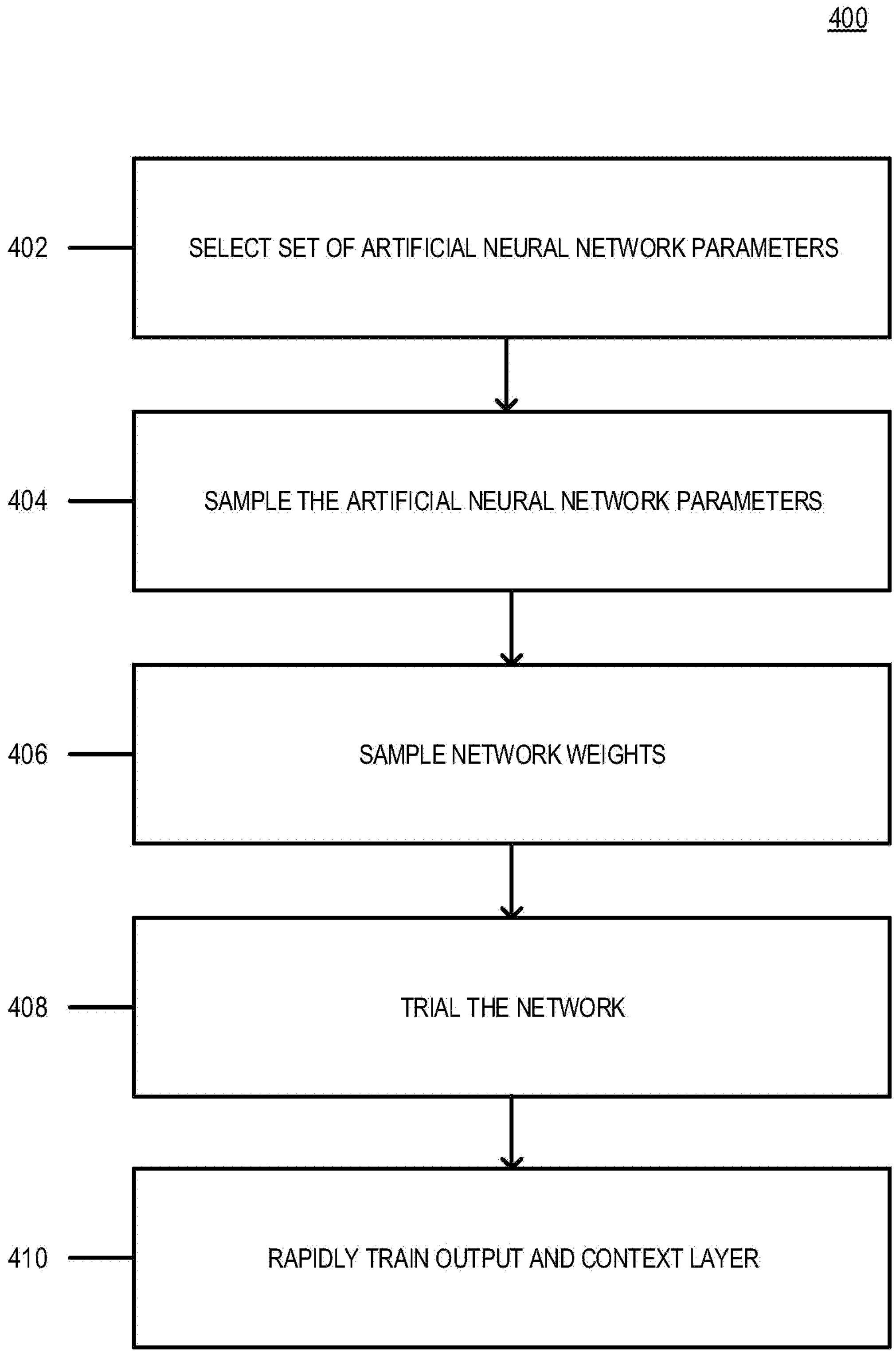
FIG. 4 depicts a computer-implemented method for identifying specific combinations of artificial neural network parameters that produce networks capable of rapid learning, according to some aspects.

The present techniques include properly initializing networks capable of rapidly solving tasks with constrained plasticity, using a computer-implemented random generation method 400, depicted in FIG. 4. For example, the method 400 may be performed by the ML operation module 164 of FIG. 1. The method 400 overcomes a specific technical problem; namely, that it is not known, a priori, which networks or network parameters should be selected in order to create a properly-initialized network. Yet, those of ordinary skill in the art will appreciate the importance of establishing suitable initial conditions.

In some aspects, the method 400 may include selecting a set of artificial neural network parameters (e.g., 26 parameters) (block 402). These network parameters may be modeled (loosely or otherwise) upon properties of in vivo neural circuits. The method 400 may further include sampling (e.g., randomly) the network parameters from a uniform distribution with defined ranges (block 404). The method 400 may include selecting connection weights for one or more artificial neural networks (e.g., via random sampling) from a distribution parameterized by the network parameters (block 406). The parameters are discussed further below, in Table 1.

The set of parameters may control connectivity and/or activity of the model (i.e., the one or more ML models), and be based on the physical properties that define neural circuits in vivo. As discussed above, the parameters may control the strength of connections between and within excitatory and inhibitory neurons in the recurrent layer, network topology, and/or normalization, amongst others.

Synaptic plasticity is crucial for the proper functioning of neural circuits. Thus, the method 400 may include identifying RNNs with specific characteristics that are capable of rapidly learning all of a number of tasks with limited synaptic plasticity. The method 400 may further include verifying that the selected set of network parameters will produce networks (e.g., RNNs) capable of rapid learning, by performing a random search across these parameters. As discussed, the random search may include randomly sampling N parameters from defined ranges, wherein N is the number of parameters. The method 400 may further include randomly sampling network weights from probability distributions governed by these N parameters. The method 400 may further include running this network on a batch of trials, and determining whether network activity is within a reasonable range (block 408).

Figure 5A:
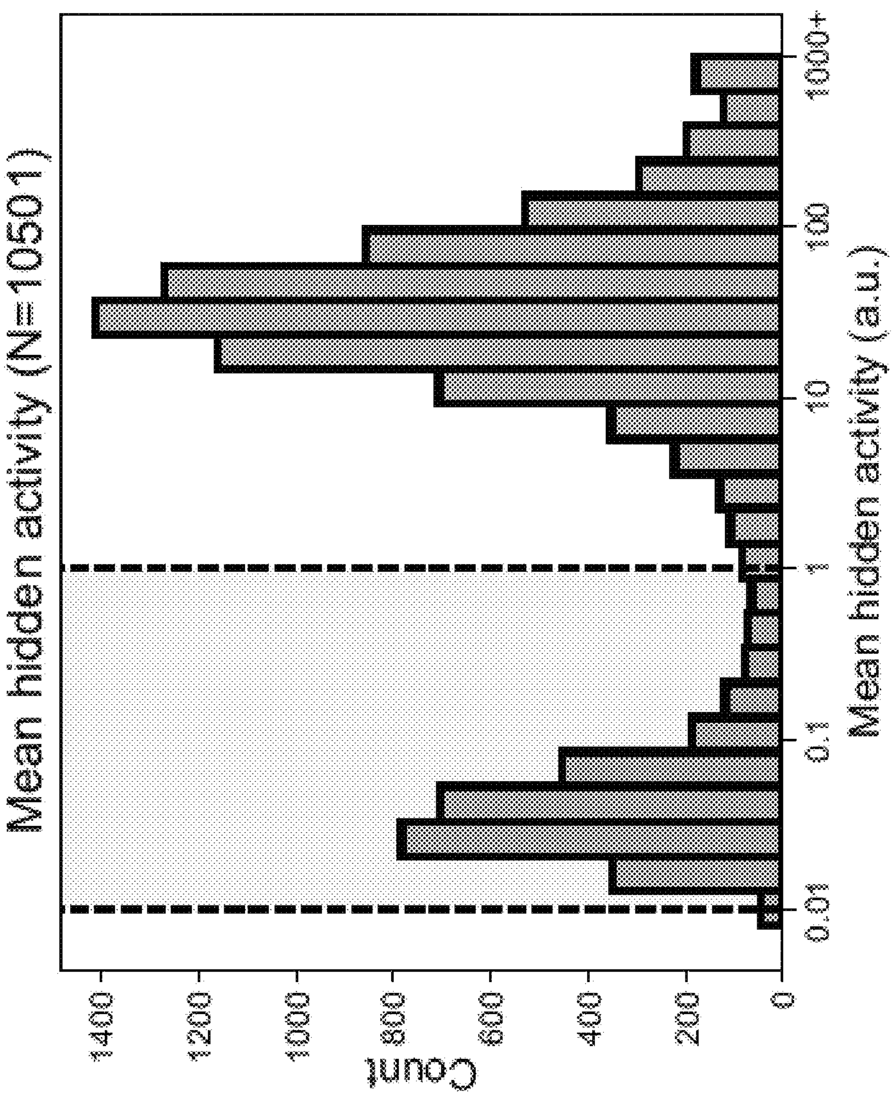
FIG. 5A depicts a chart of mean activity from a recurrent layer measured before any training, according to some aspects.

The method 400 may include, when the network activity is within the reasonable range, rapidly training the output and context layers on a number (e.g., 175) of batches of a number (e.g., 256) of trials (e.g., 7,467 trials per task) (block 410). The method 400 may be performed for a large sampling of potential networks. Empirical testing using the method 400 has demonstrated that out of many (e.g., 10,000 or more) networks randomly sampled, only a fraction (~25%) generated mean activity below 1 (shaded region between 0.01 and 1, as depicted in FIG. 5A), which was empirically observed as being strongly associated with successful training. The method 400 may include discarding networks that generate mean activity above this value.

Figure 5B:
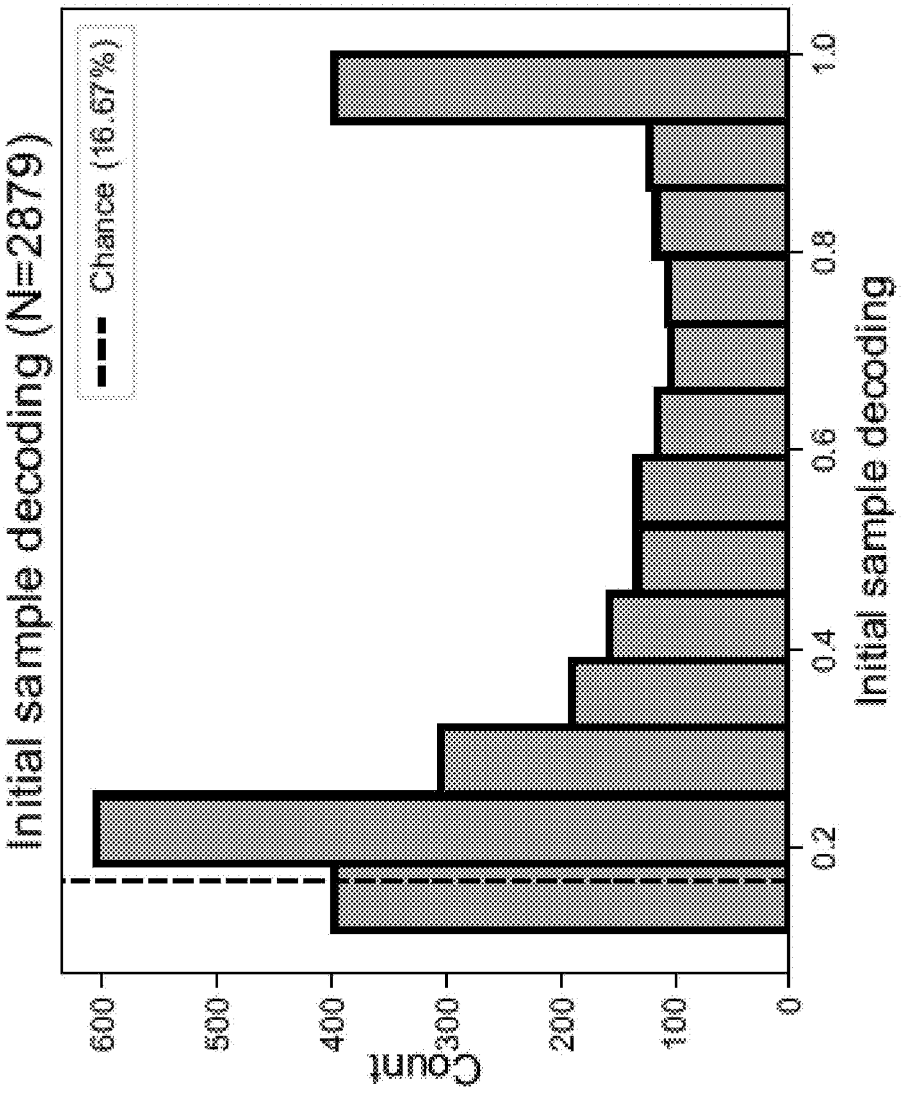
FIG. 5B depicts a chart of sample decoding accuracy measured at the end of the delay period, according to some aspects.

In some aspects, some or all of the tasks may require maintaining information in short-term memory. Thus, the method 400 may include calculating how accurately the networks could encode the identity of the sample stimulus at the end of the delay period. As depicted in FIG. 5B, the distribution of sample decoding accuracies, measured at the end of the delay period, may be highly skewed towards chance level (1/T), as indicated by the dashed line, where T is the number of tasks, indicating that most networks were not capable of maintaining sample information across the delay period. This is unsurprising, as the networks may not be trained to encode information in short-term memory. However, in the depicted example, the sample decoding accuracy from a small subset of networks was closer to one (perfect decoding), suggesting that some networks were capable of reliably maintaining sample information across the delay period needed to solve the tasks.

Figure 5C:
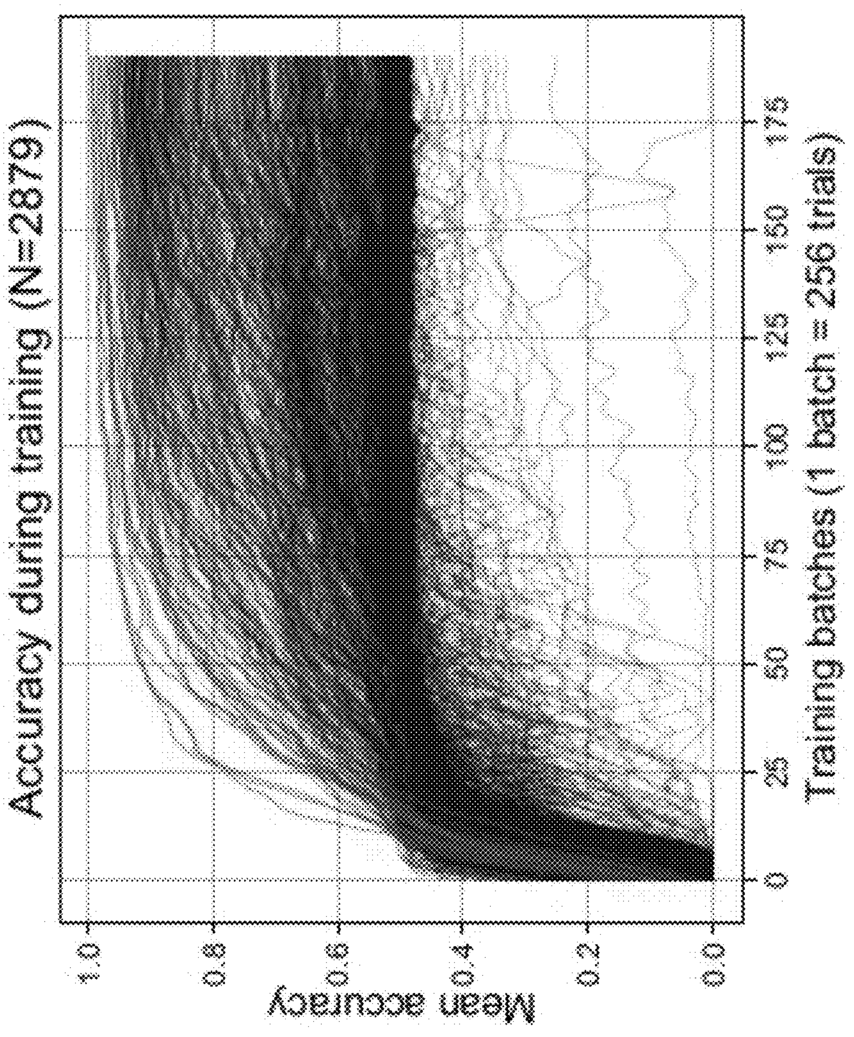
FIG. 5C depicts a chart of mean accuracy across the T tasks measured after each training batch for a number of networks with suitable mean activity.

As noted, the method 400 may include training each of the networks having suitable mean activity (2879 of them, in the depicted example) on a number (e.g., 175) of batches of trials (e.g., 256 trials). The method 400 may include calculating the mean accuracy across the T tasks during training, as shown in FIG. 5C, wherein mean accuracy across the T tasks measured after each training batch for the number of networks with suitable mean activity. In the depicted example of FIG. 5C, the red traces are from the top-performing networks (N=19) that achieved >95% mean accuracy at the end of training.

Figure 5D:
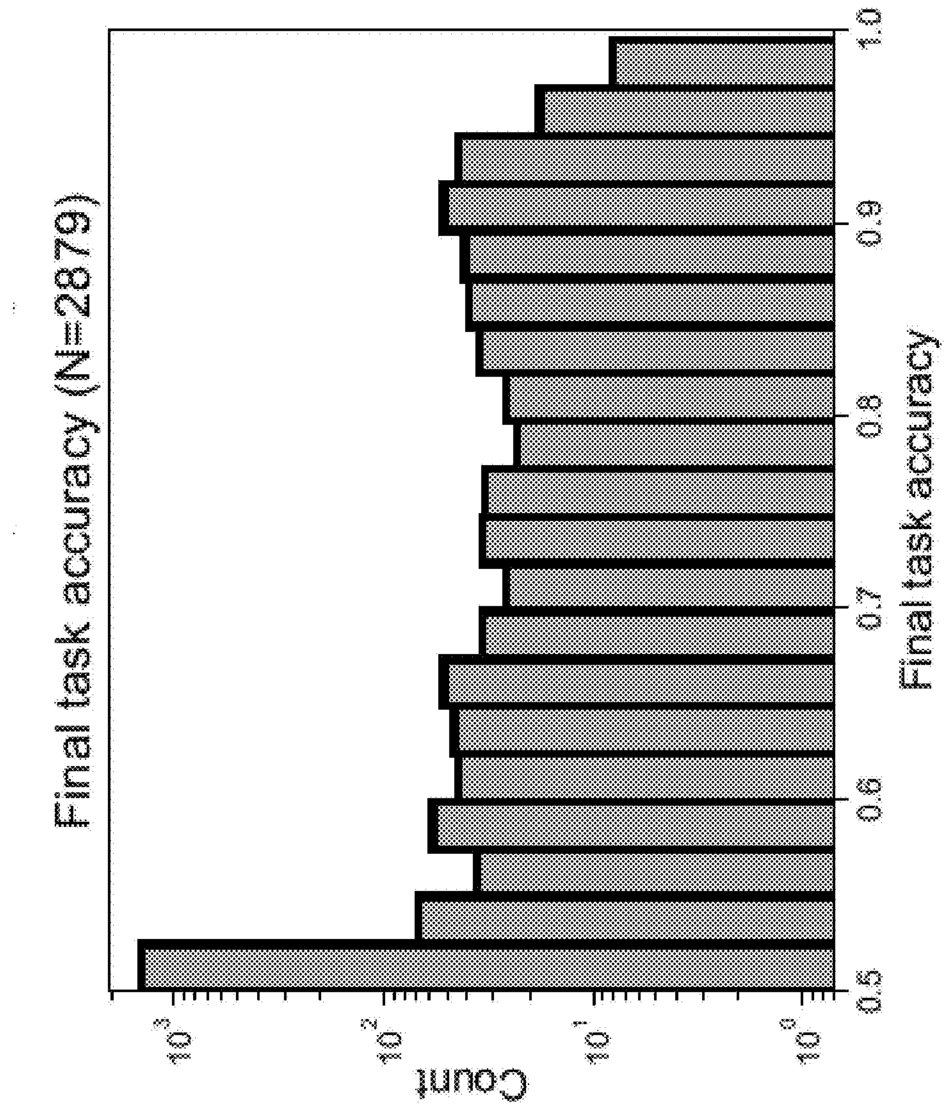
FIG. 5D depicts a chart of a distribution of mean accuracy across T tasks at the end of training, according to some aspects.

The method 400 may further include calculating the distribution of final accuracies at the end training, as depicted in FIG. 5D. The y-axis may be on a logarithm scale in FIG. 5D. In the depicted example, most networks achieved accuracies of 50%. Those of ordinary skill in the art will appreciate that this is the expected level of performance if the networks learned not to break fixation too early, but no more. In the depicted example, the vast majority of networks failed to properly learn the tasks. However, a small fraction of networks were capable of rapidly learning the T tasks simultaneously to a reasonably high accuracy (e.g., in the depicted example, 19/2879 networks achieved >95%).

Figure 5E:
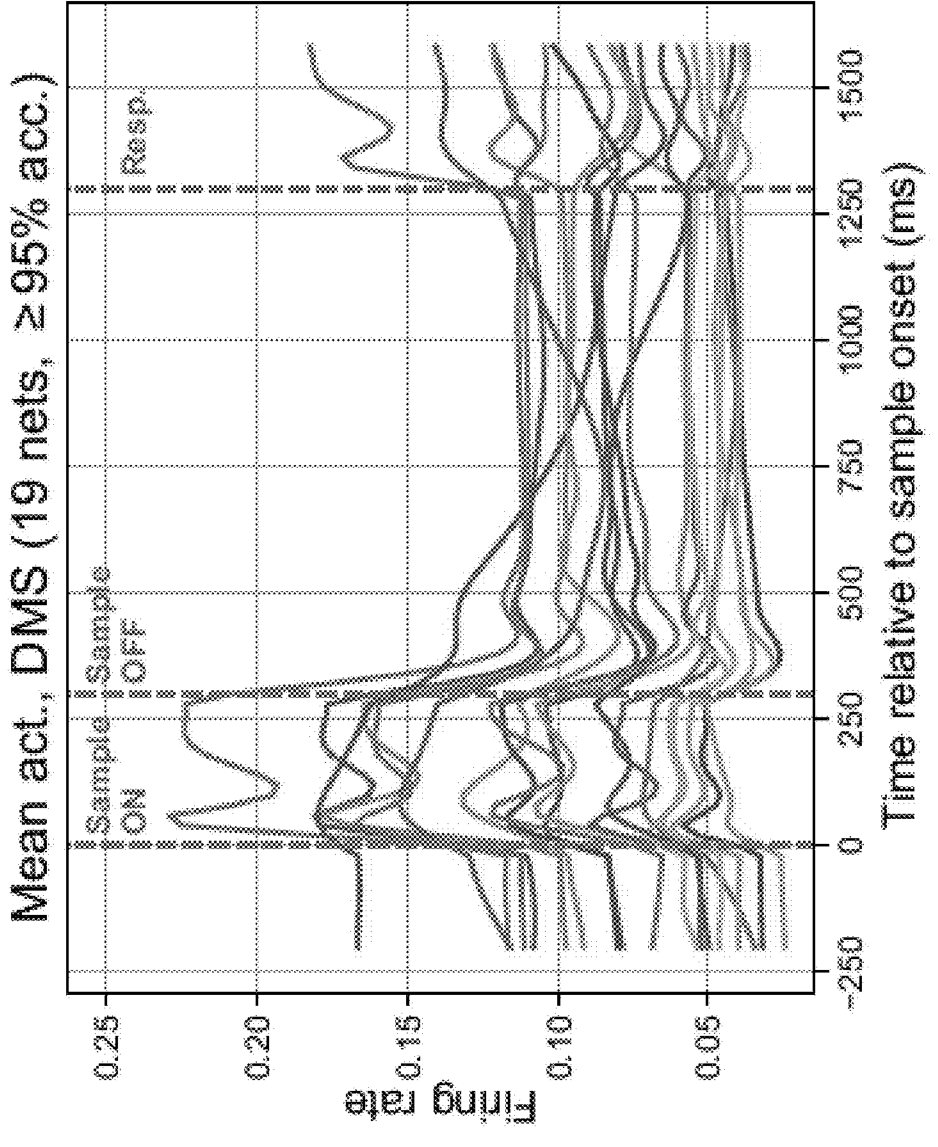
FIG. 5E depicts a chart of mean activity from a recurrent layer across trial time for a number of top-performing networks, according to some aspects.

The method 400 may include computing mean activity from the recurrent layer across trial time for the top-performing networks, as shown in FIG. 5E. Sample onset, offset and test onset are indicated in FIG. 5E by dashed vertical lines.

Figure 5F:
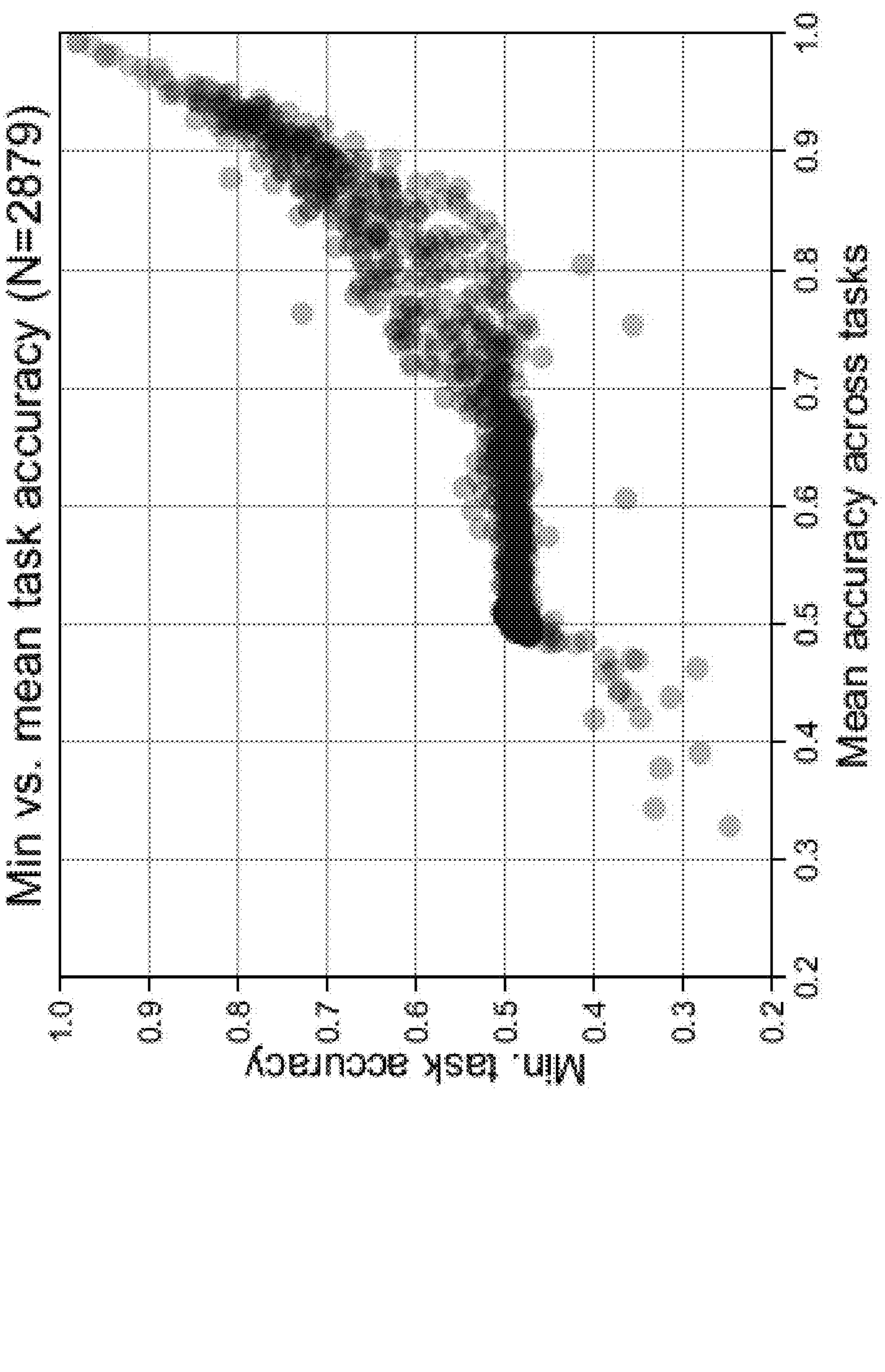
FIG. 5F depicts a scatter plot showing the mean and minimum accuracies after training for each of a number of trained networks, according to some aspects.

The method 400 may include comparing the mean accuracy across all T tasks, as shown on the x-axis of FIG. 5F, to the minimum accuracy across the T tasks (y-axis of FIG. 5F). In FIG. 5F, the red circles indicate the top-performing networks. This computation may be performed to ensure that these networks learned all tasks, and not just a few. In the depicted example, for all but one of the 20 highest-performing networks (e.g., with mean accuracy above 93%), the minimum observed task accuracy exceeded 80%, suggesting that these networks learned to competently perform all tasks.

The method 400 may further include computing the mean network activity across time (e.g., measured from the recurrent module during the DMS task) of one or more networks identified as high-performing. Empirically, a large variety of neural responses may be observed, highlighting how different sets of parameters generate distinct patterns of neural activity. Neural traces from many of the networks may resemble what is typically found in vivo, with transient and sustained responses to the sample and test stimuli, and ramping activity during the delay period, suggesting that neural dynamics of these networks, at some level, resembles that of neural dynamics found in vivo.

Reliability of High-Performing Network Parameters

The method 400 may be used to identify network models that are capable of rapidly learning multiple tasks with highly localized synaptic changes, provided that they are properly initialized with appropriate parameters. However, those of ordinary skill in the art may question whether it was possible that these high-performing networks were the result of sample bias after training thousands of network models. Thus, in some aspects, to confirm that the set of parameters that define each of these high-performing networks reliably generate networks that can rapidly learn new tasks, the method 400 may further include randomly resampling network weights using the parameters of the identified top-performing best networks, and retraining the networks. This may be performed a number of times (e.g., five or more) for each set of parameters.

Figure 6:
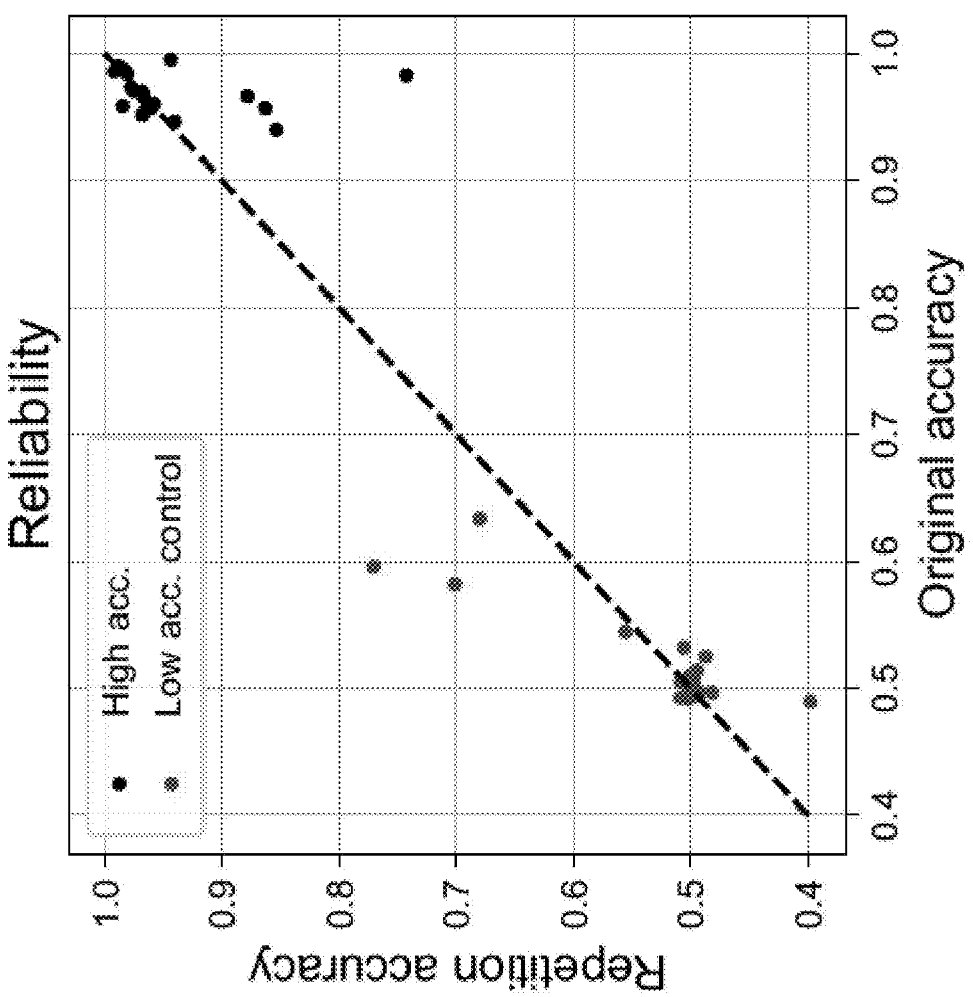
FIG. 6 depicts a scatter plot showing network reliability as a function of task accuracy in resampled and retrained networks, according to some aspects.

Empirical testing using this resampling approach demonstrated that for about half of the parameter sets (e.g., 11/20 in the depicted example), task accuracy of the given resampled and retrained networks (y-axis, as depicted in FIG. 6) was consistent with (e.g., within 2 percentage points of) the original accuracies (x-axis, as depicted in FIG. 6). In FIG. 6, the original sweep is shown on the x-axis, and the mean accuracy after resampling network weights and retraining is shown on the y-axis. Black circles represent the 19 top-performing network parameters, and red circles are a randomly-selected subset of network parameters that scored between 45% and 65% in the original sweep.

For a few other networks (e.g., 6/20), accuracy from the resampled networks may be less than the original accuracy, but still high (e.g., >80%) on average. Accuracy of network parameters in yet more networks (e.g., 3/20) may be highly variable or low, on average. Thus, while a few networks may achieve high accuracy due to selection bias during the initial sweep, those of ordinary skill in the art will appreciate that most parameters that generated igh-performing networks do so consistently, even after randomly re-sampling their connection weights, meaning they are, indeed reliable.

Generalizability of High-Performing Networks

Figure 7A:
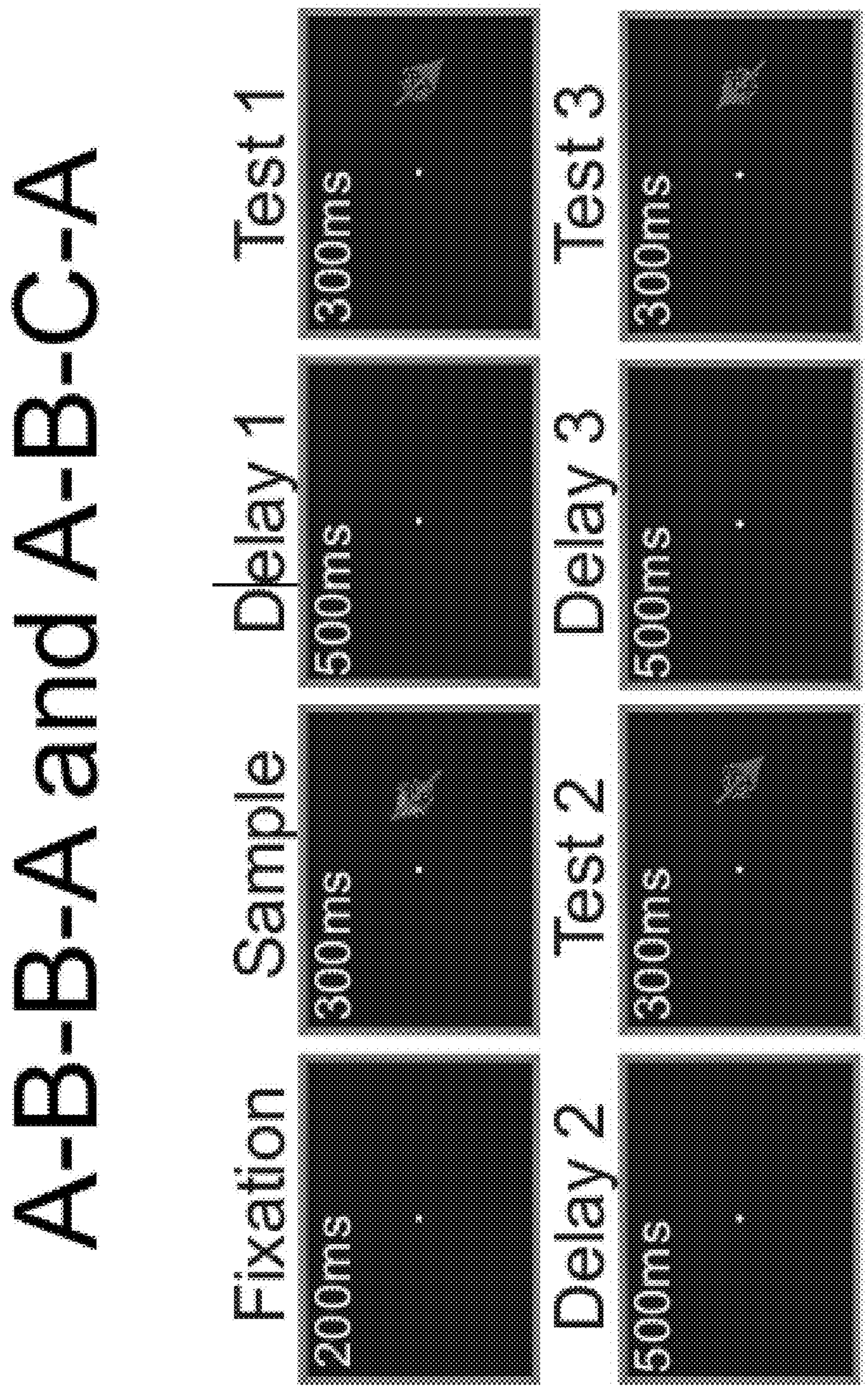
FIG. 7A depicts motion direction graphs generated while training artificial neural networks to learn published tasks; according to some aspects.

In some aspects, the method 400 may include determining whether the networks identified as high-performing can successfully generalize to novel tasks. Thus, the method 400 may further include resampling network weights using the set of artificial neural network parameters of the top-performing networks, and training networks to perform two delayed match-to-sample tasks with multiple distractors. These published tasks (i.e., an A-B-B-A task and an A-B-C-A task) are depicted in FIG. 7A. For example, in both tasks, a sample stimulus may be shown, followed by three test stimuli. The networks may be tasked with determining whether the sample and test stimuli matched. In the A-B-B-A task, there was a 50% chance that a subsequent test stimuli had the same direction. For the A-B-C-A task, this probability was 0%. In both tasks, a sample stimulus was followed by three sequentially presented test stimuli, and the network had to indicate whether each test matched the sample. In the A-B-B-A task, if a test stimulus was a non-match, there was a 50% probability that the test would be repeated immediately. This forced the network to encode sample and test stimuli in different ways: if the sample and test were encoded in the same manner, then the network would not be able to distinguish between a test that matched the sample compared with a repeated non-match. In the A-B-C-A task, non-matching test stimuli were never repeated during a single trial, so the network was not required to represent sample and test stimuli in different formats. Importantly, the temporal sequence of events in A-B-B-A and A-B-C-A may differs from that of the original six tasks, all of which may share a common temporal sequence (i.e., sample/delay/response identically timed).

Figure 7B:
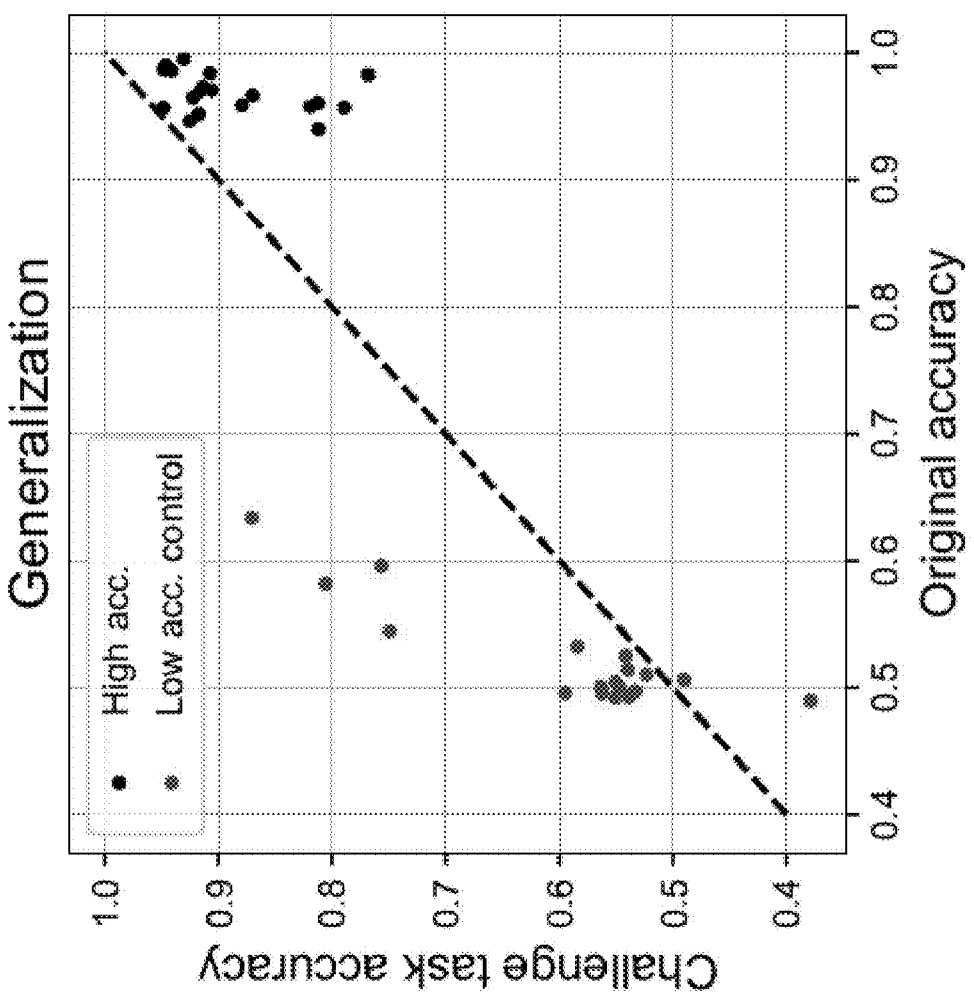
FIG. 7B depicts a scatter plot showing network generalizability as a function of network performance as a function of performance using resampled network weights in published tasks.

The method 400 may include testing the top-performing networks against an equal number of randomly selected network parameters randomly that achieved, for example, between 45 and 65% accuracy in the large-scale sweep discussed above. In the example shown in FIG. 7B, on average, the top-performing networks achieved 84.1% on the A-B-B-A task and 85.2% on the A-B-C-A task (FIG. 7B, black circles), compared to 51.4% and 51.5% for the low-performing networks, respectively (FIG. 7B, red circles; $p<10^{-7}$, N=20, Wilcoxon rank-sum test). Similar to the reliability test depicted in FIG. 6, most, but not all, networks successfully learned the two tasks, with 16/20 networks achieving a combined accuracy of 80%, and 11 of those 16 exceeding 90% respectively. Thus, the majority of 20 top-performing network parameters can reliably generate networks that can solve existing or novel sets of cognitive tasks, demonstrating generalizability of the present techniques.

Figure 8A:
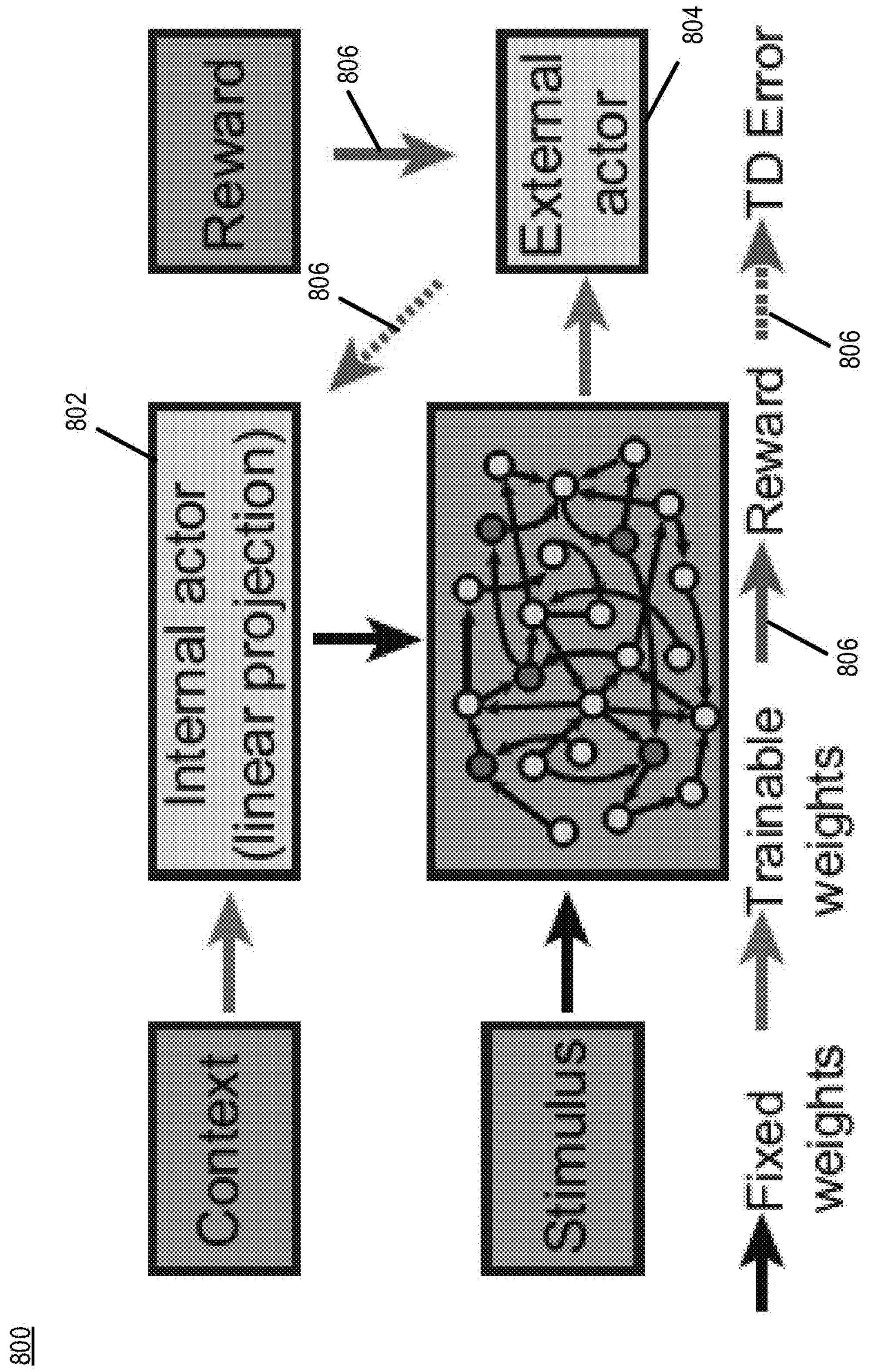
FIG. 8A depicts another exemplary artificial neural network architecture for learning cognitive tasks, according to some aspects.
Figure 8B:
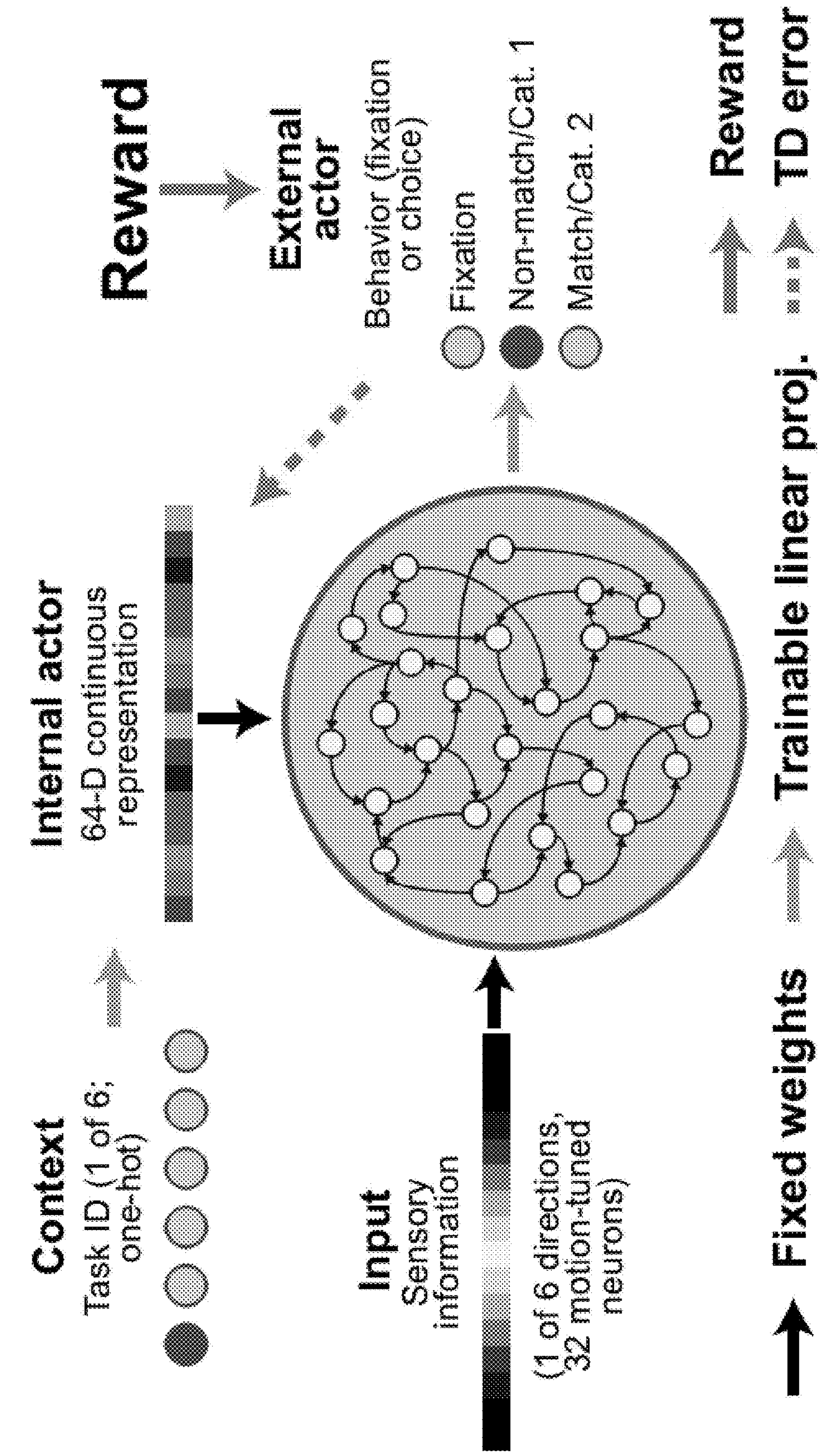
FIG. 8B depicts an alternative view of the exemplary artificial neural network architecture of FIG. 8A, according to some aspects.
Figure 9A:
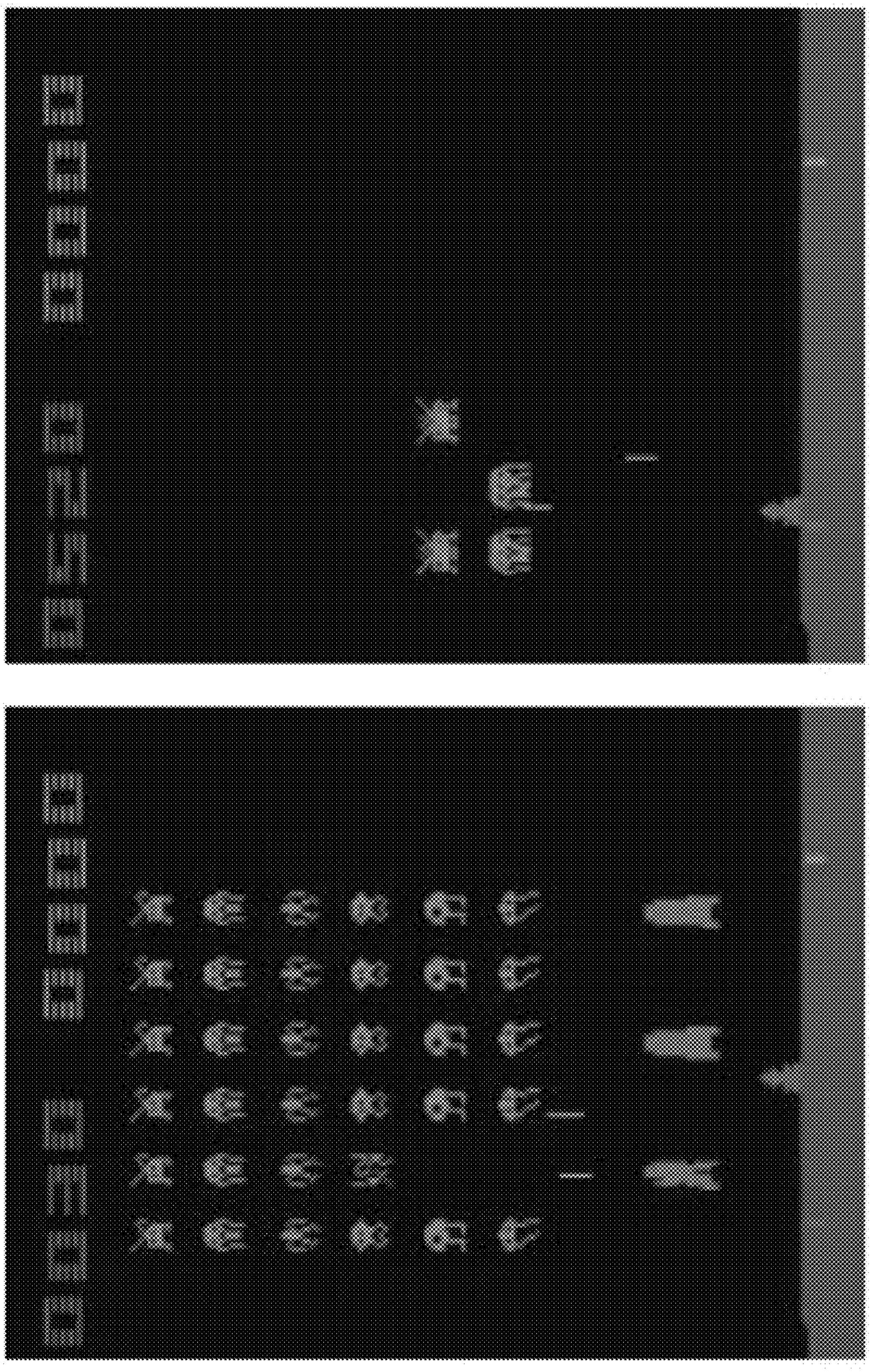
FIG. 9A depicts an example of playing Space Invaders using an artificial neural network trained using the present rapid learning with highly localized synaptic plasticity techniques, according to some aspects.
Figure 9B:
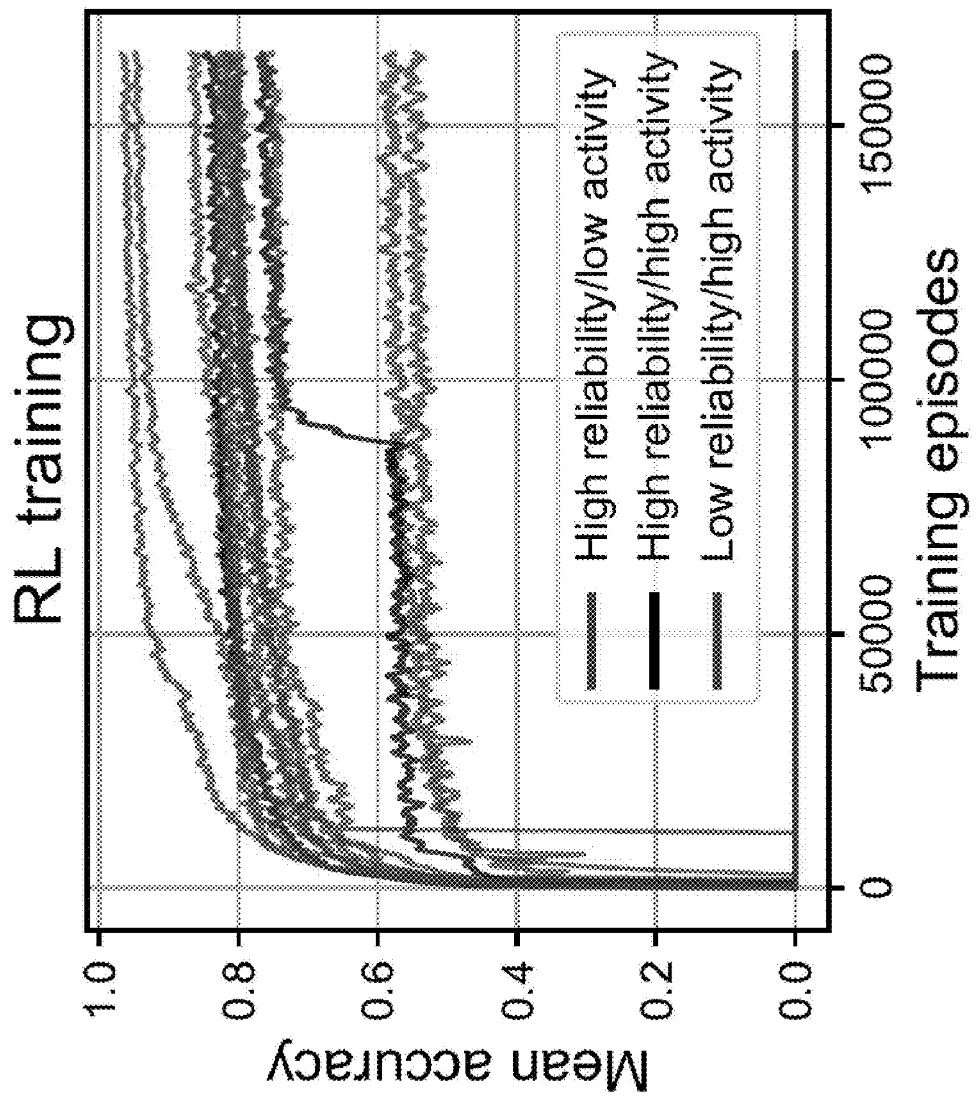
FIG. 9B depicts a chart including reinforcement training results for top-performing networks across different cognitive tasks, according to some aspects.

Applying Exemplary Training of Rigid Networks without Backpropagation to Higher Order Tasks The network architecture depicted in FIG. 8A involving two interacting actors (i.e., the same RL methods discussed above) also allows artificial neural networks to learn higher order, more demanding tasks, such as computer games played by humans. FIG. 8B depicts an alternative view of the exemplary artificial neural network architecture of FIG. 8A, according to some aspects. For example, the method 400 may include testing a modified version of the network architecture 800 of FIG. 8A using a computer game (e.g., the Atari game Space Invaders), as shown in FIG. 9A. FIG. 9B, below, depicts a chart including reinforcement training results for top-performing networks across different cognitive tasks, according to some aspects.

Figure 9C:
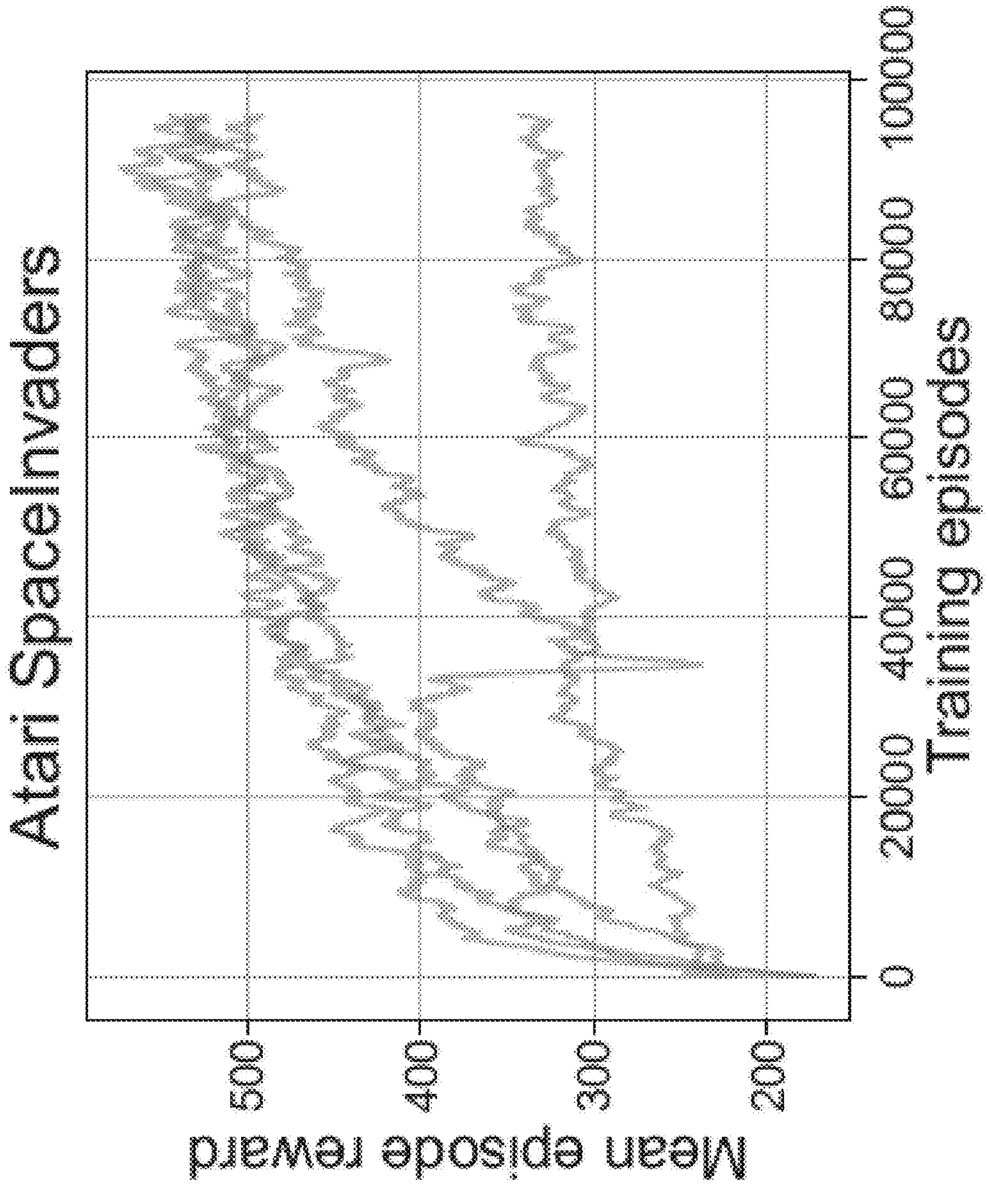
FIG. 9C depicts a chart of mean rewards of an artificial neural network playing Space Invaders, according to some aspects.

In some aspects, the method 400 may include replacing the recurrent layer with a series of random and fixed feedforward layers. The method 400 may include providing an input signal to the network 800 using a β-variational autoencoder that encodes the game screen into a compressed representation. As shown in FIG. 9C, in empirical testing, the modified network achieved a mean reward of 487.2 per episode, and 3/5 runs (network seeds) achieved a mean score above 500. This score demonstrates task competency, and that the present RL techniques can be generalized to work with feedforward networks trained on realistic examples. It will be appreciated by those of ordinary skill in the art that the present techniques may be used with any suitable machine learning models, including supervised and unsupervised modeling techniques, and different network architectures (e.g., convolutional neural networks, memory networks, radial basis function networks, federated learning networks, etc.).

Biologically-Plausible Learning

The present techniques ably demonstrate that RNNs can rapidly learn new tasks with synaptic changes localized to the output and top-down layers. However, as discussed, using the architecture of FIG. 3A, training still requires backpropagation through the hidden layers and through time, which is hypothesized to be difficult for biological circuits to implement.

Therefore, in some aspects, the method 400 may include learning the cognitive tasks discussed with respect to FIG. 3A using RNNs (or other strategies/architectures) in a more biologically-plausible manner, using only local error signals (i.e., without backpropagation through hidden layers or through time). In order to avoid backpropagation, the method 400 may include training a network architecture 800, depicted in FIG. 8A, using policy-based reinforcement learning (RL) as opposed to supervised learning, as done with the network architecture 300 of FIG. 3A, for example.

The network architecture 800 of FIG. 8A is similar to the network architecture 300 of FIG. 3A, but includes two actors trained using RL—an internal actor 802, that acts on the internal environment (i.e., the recurrent layer) and an external actor 804, that acts on the external environment (e.g., responding to the tasks). In general, the actor 802 and the actor 804 remove the need for error signals to backpropagate through hidden layers of the network 800 (depicted by reference numerals 806).

The output layer of the architecture 800 may include a policy layer, from which actions the networks performs may be sampled, and a critic layer, that may estimate a discounted future reward. The top-down layer of FIG. 3A may be replaced with the internal actor 802, also trained using RL. The method 800 may still receive as input a one-hot rule signal to the internal actor 802, but may also include a continuous-value linear policy function, from which actions may be sampled that will "act" (i.e. linearly project) onto the recurrent layer. Thus, the network architecture 800 may include two interacting RL-trained actors; one that observes acts upon the external environment in the traditional manner, and a second that acts upon the "internal" environment (i.e. the recurrent layer of the first actor). It will be appreciated by those of ordinary skill in the art that these RL-trained actor aspects advantageously enable a network modeled after the architecture 800 to learn the proper top-down signal to control activity in the recurrent layer without the need for backpropagation of error signals.

The method 400 may include testing the method on the top-performing network parameters, and generating new RNNs from these sets of parameters. In some aspects, the method 400 may train these networks using RL (e.g., for <150,000 trials per task). In empirical testing, about half of the networks were capable of accurately learning the six tasks of the example discussed above, without backpropagation through the network or through time, with 9/20 networks achieving >80% accuracy over the final 100 trials, and 2 of those 10 achieving >90% accuracy over the final 100 trials. This performance is depicted in FIG. 9B, below. Two of the 20 networks achieved an intermediate level of performance (75% accuracy), successfully learning some of the tasks but not others. Not all networks were able to learn the tasks: 2/20 learned to fixate until the test period but failed to learn task-specific rules beyond that, achieving around 55% accuracy, while 7/20 networks failed even learn to fixate. These learning failures can largely be explained by instability resulting from high activity. Seven of the 9 networks that failed to learn any of the tasks past chance accuracy had average activity (e.g., >0.1 in the above-described reliability test). Two parameter sets generated networks that had high average activity but were also highly reliably accurate. These networks achieved intermediate performance when trained with reinforcement learning. However, this experiment represents proof that interacting sets of RL agents can learn cognitively demanding tasks without the need for backpropagation through hidden layers or through time.

This is an important result, because as appreciated by those of ordinary skill in the art, backpropagation is typically the most computationally demanding activities in any machine learning system. By avoiding backpropagation, the present techniques advantageously enable rapid learning with highly localized synaptic plasticity to be used in devices (e.g., mobile devices, desktop devices, etc.) in a low-power mode without draining the device battery, or in a standard mode with much better resource utilization profiles. Other resource utilization benefits are envisioned, beyond energy efficiency, including faster learning (due to constrained plasticity, instead of global backpropagation), keeping the network in a fixed state where brute-forcing changes to every connection is not required, reducing the amount of memory needed due to not needing to transform errors from top layers of the network throughout the entire network, more rapid learning, on-the-fly learning, etc. In general, the present techniques represent a significant improvement over conventional techniques that rely on backpropagation through hidden layers or across time.

Exemplary Reinforcement Learning

In order to train networks to perform the tasks using a reinforcement learning framework, correct/incorrect behavioral responses may be used at each time step to assign rewards/penalties to each possible policy for each state (i.e., a reward structure). Each correct decision during the test period may earns a reward (e.g., 1.0), while each incorrect decision during the test period earns a penalty (e.g., −0.01). Breaking fixation at any time-point outside the test period may be assigned a penalty (e.g., −1) as may be failing to break fixation during the test period. As noted, the tuning of the motion direction selective neurons may follow a von Mises distribution.

Exemplary Network Dynamics

Network dynamics may be governed by the following equations, wherein the term u may represent the activity of the stimulus input, c may represent the activity of the context signal, and r may represent the activity of the recurrent layer. The context signal may be first linearly transformed into a top-down signal, $v=cW^c$, where the linear transformation $W^c$ is a trainable matrix. The activity of the recurrent neurons may be modeled, to follow the dynamical system:

$$\tau\frac{dr}{dt} = -r + f\left(uW^{in} + vW^{top} + rW^{rec} \odot \frac{1}{1+n} + \sqrt{2}\,\tau\sigma_{rec}\zeta\right)$$

where τ is the neuron's time constant (e.g., 100 ms); f(•) is an activation function (e.g., ReLu); $W^{in}$, $W^{top}$ and $W^{rec}$ are, respectively, the input, top-down and recurrent connection weights; (is independent Gaussian white noise with zero mean and unit variance applied to all recurrent neurons; and $\sigma_{rec}$ is the strength of the noise (e.g., set to 0.05 when training using supervised learning, and 0 when training with reinforcement learning). In some aspects, the connection weights $W^{in}$, $W^{top}$ and $W^{rec}$ are fixed (i.e., non-trainable).

The vector n may be a normalization term that controls the effective strength of recurrent connectivity, governed by the system $$\tau\frac{dn}{dt} = -n + rW^n$$

where $\tau_n$ is the normalization time constant, and the matrix $W^n$ determines how activity across the recurrent layers shunts the activity of each neuron.

The output layer may include a policy vector, which determines the action of the network. The output layer may also include, when training using reinforcement learning, a critic, which predicts the discounted future reward. These may be computed using the following equations:

$$\text{policy}=\text{Softmax}(rW^{pol}+b^{pol}),$$

$$\text{critic}=rW^{critic}+b^{critic}$$

where $W^{pol}$, $W^{critic}$ are the connection weights, and $b^{pol}$, $b^{critic}$ are the biases. These four sets of parameters may be trainable.

To stimulate the network, a first-order Euler approximation may be used, configured with a time step δt value (e.g., 20 ms):

$$r_t = (1-\alpha)r_{t-1} + \alpha f\left(u_tW^{in} + v_tW^{top} + r_{t-1}W^{rec} \odot \frac{1}{1+n_t} + \sqrt{\frac{2}{\alpha}}\,\sigma_{rec}N(0,1)\right)$$

where $$\alpha_n = \frac{\Delta t}{\tau}$$

and N(0,1) indicates the standard normal distribution. Normalization may be similarly approximated, as:

$$n_t=(1-\alpha_n)n_{t-1}+\alpha_n n_{t-1}W^n$$

where $$\alpha_n = \frac{\Delta t}{\tau_n}.$$

Exemplary Network Properties and Random Generation

As noted, it may not be known, a priori, how to properly initialize a network (e.g., an RNN) to rapidly solve a given task with constrained plasticity. Thus, the present techniques may include a method for randomly generating one or more networks from one or more parameters (e.g., 26 parameters) loosely modeled on the properties of neural circuits found in vivo. The method may include randomly sampling the parameters from uniform distribution with defined ranges (defined below). The method may include parameterizing one or more distributions using one value for each of the sampled parameters (e.g., 26 sampled values). The method may include randomly sampling connection weights from the distributions.

In some aspects, the parameters may be as follows:

TABLE 1

| Network weight initialization parameters | | | |
|---|---|---|---|
| | Name | Description | Range |
| | | Recurrent weight distribution shape/topology | |
| 1 | $\kappa_{EE}$ | Shape of excitatory-to-excitatory (EE) weight distrib. | [0.05, 0.25] |
| 2 | $\kappa_{EI}$ | Shape of excitatory-to-inhibitory (EI) weight distrib. | [0.05, 0.25] |
| 3 | $\kappa_{IE}$ | Shape of inhibitory-to-excitatory (IE) weight distrib. | [0.05, 0.25] |
| 4 | $\kappa_{II}$ | Shape of inhibitory-to-inhibitory (II) weight distrib. | [0.05, 0.25] |
| 5 | $\lambda_{EE}$ | Shape of topological modifier for EE connectivity | [0, 2] |
| 6 | $\lambda_{EI}$ | Shape of topological modifier for EI connectivity | [0, 2] |
| 7 | $\lambda_{IE}$ | Shape of topological modifier for IE connectivity | [0, 2] |
| 8 | $\lambda_{II}$ | Shape of topological modifier for II connectivity | [0, 2] |
| 9 | $\omega_r$ | Global strength of recurrent weights | [0.05, 0.2] |
| | | Recurrent reciprocal connectivity | |
| 10 | $\alpha_{EE}$ | Strength of reciprocal connectivity between pairs of E units | [0, 0.3] |
| 11 | $\alpha_{EI/IE}$ | Strength of EI/IE reciprocal connectivity | [0, 0.3] |
| 12 | $\alpha_{II}$ | Strength of II reciprocal connectivity | [0, 0.3] |
| | | Bottom-up input weight distribution shape/topology | |
| 13 | $\kappa_{inp,\ E}$ | Shape of bottom-up input weight distribution onto E units | [0.05, 0.25] |
| 14 | $\kappa_{inp,\ I}$ | Shape of bottom-up input weight distribution onto I units | [0.05, 0.25] |
| 15 | $\lambda_{inp,\ E}$ | Shape of topological modifier for bottom-up input onto E units | [0, 2] |
| 16 | $\lambda_{inp,\ I}$ | Shape of topological modifier for bottom-up input onto I units | [0, 2] |
| 17 | $\omega_{inp}$ | Global strength of bottom-up input weights | [0.05, 0.2] |
| | | Activity normalization weights | |
| 18 | $\beta_{EE}$ | Strength of normalization between pairs of E units | [0, 2] |
| 19 | $\beta_{EI}$ | Strength of normalization from E to I units | [0, 2] |
| 20 | $\beta_{IE}$ | Strength of normalization from I to E units | [0, 2] |
| 21 | $\beta_{II}$ | Strength of normalization from I to I units | [0, 2] |
| 22 | $\tau_n$ | Time constant of network activity modulation | [20, 100] |
| | | Top-down input weight distribution shape/topology | |
| 23 | $\kappa_{TD,\ E}$ | Shape of top-down weight distribution onto E units | [0.05, 0.25] |
| 24 | $\lambda_{TD,\ E}$ | Shape of topological modifier for top-down input onto E units | [0.05, 0.25] |
| 25 | $\kappa_{TD,\ I}$ | Shape of top-down weight distribution onto I units | [0, 2] |
| 26 | $\lambda_{TD,\ I}$ | Shape of topological modifier for top-down input onto I units | [0, 2] |

The method may include generating initial recurrent weights. The method may include sampling initial excitatory-to-excitatory, excitatory-to-inhibitory, inhibitory-to-excitatory and inhibitory-to-inhibitory connections from a distribution (e.g., a gamma distribution with a scale parameter of 1.0) and a shape parameter (e.g., $\kappa_{EE}$, $\kappa_{EI}$, $\kappa_{IE}$, $\kappa_{II}$, respectively). The method may include increasing the weights between reciprocally-connected neurons, and/or decreasing weights between all non-reciprocally connected neurons, as follows:

$$W_{EE} \leftarrow \frac{W_{EE} + \alpha_{EE} W_{EE}^{T}}{1 + \alpha_{EE}}$$

$$W_{EI} \leftarrow \frac{W_{EI} + \alpha_{EI} W_{IE}^{T}}{1 + \alpha_{EI}}$$

$$W_{IE} \leftarrow \frac{W_{IE} + \alpha_{EE} W_{EI}^{T}}{1 + \alpha_{EI}}$$

$$W_{II} \leftarrow \frac{W_{II} + \alpha_{II} W_{II}^{T}}{1 + \alpha_{II}}$$

where T represents the transpose.

The method may include adding topological structure to the recurrent layer by assuming that excitatory and inhibitory neurons were equally spaced along a ring. Specifically the method may include assigning angles equally distributed between 0 and 2π to the excitatory and inhibitory neurons. The method may include increasing connection weights between neurons that are close together according to the cosine of their angular distance, cos θ, and decreasing connection weights between those neurons that were far apart using a von Mises distribution:

$$W_X \leftarrow W_X Z_X \frac{\exp \lambda_X \cos\theta}{\exp \lambda_X}$$

where X represents either EE, EI, IE or II and Zs are chosen, such that the mean connection weight for each group is left unchanged. The method may include scaling all connection weights by a global scalar, $W_r$.

The method may initialize bottom-up and to-down weights in a similar manner. The method may sample initial connection weights using gamma distribution, where $\kappa_{BU,E}$ and $\kappa_{TD,E}$ was a shape parameter of bottom-up and top-down projections onto the recurrent excitatory neurons, and $\kappa_{BU,I}$ and $\kappa_{TD,I}$ was a shape parameter of bottom-up and top-down projections onto the recurrent inhibitory neurons. The method may endow both bottom-up and top-down neurons with a topological structure by evenly spacing them along a ring, in which they are assigned angles equally distributed between 0 and 2π. For bottom-up neurons, this angle may be identical to their preferred motion direction. The method may apply the above von Mises-like function, to scale weights based upon their angular distance. The method may include performing this scaling separately for the bottom-up and top-down projections onto excitatory neurons using $\lambda_{BU,I}$ and $\lambda_{TD,I}$, respectively. The method may include scaling bottom-up weights by a global scalar, $W_{BU}$.

The method may include applying a matrix that determines how activity in the recurrent layer normalizes activity, $W^n$, consisting of four unique values:

$$W^n = \begin{bmatrix} \frac{\beta_{EE}}{N_E} & \frac{\beta_{EI}}{N_E} \\ \frac{\beta_{IE}}{N_I} & \frac{\beta_{II}}{N_I} \end{bmatrix}$$

where $N_E$ and $N_I$, respectively, are the number of excitatory (e.g., 2000) and inhibitory (e.g., 5000) neurons in the recurrent layer. The method may define a time constant controlling the dynamics of normalization as $T_n$. The method may initialize a bias term for all neurons as 0, and may set self-connections to 0. The method may include clipping all initial weights above 2.

Exemplary Network Architecture for Reinforcement Learning of Cognitive Tasks

When training using reinforcement learning, the network may include two different actors. The "external" actor, including the output layer, may be responsible for selecting discrete actions to solve the cognitive tasks. The external actor policy vector may be of size 3, and the critic vector of size 2. The "internal" actor, including the top-down layer, was responsible for selecting continuous action signals that were projected onto the recurrent layer. The internal actor policy vector may be of size 64, and actions were sampled from a normal distribution, with mean value equal to the policy vector, and standard deviation of $o_c$, initially 0.1 and linearly decayed at each time step to a final value of 0.01, for example. The sampled actions may be capped at ±5. The 2-D critic vector may be responsible for predicting the discounted future reward at two different timescales. The fast timescale, with a discount factor γ=0.9, may be used to train the external (discrete) actor, and the slow timescale, with a discount factor γ=0.95, may be used to train the internal (continuous) actor.

Exemplary Network Training and Testing—Supervised Learning and Reinforcement Learning In some aspects, training the networks discussed above may use the Adam optimizer. For supervised learning, the learning rate may be 0.02 for the output layer, 0.002 for the top-down layer, and $\epsilon=10^{-7}$. For reinforcement learning, the learning rate may be 0.01 for the policy and critic layers (i.e. the external actor), $5\times10^{-5}$ for the top-down layer (i.e. the internal actor), and $f=10^{-5}$. In both cases, the batch size may be 256. The cross-entropy loss function may be used to train the networks discussed herein using supervised learning. When training the two cooperating actors using reinforcement learning, proximal policy optimization (PPO) may be used. For example, a time horizon may be one time step, and training data split into four mini-batches. The present techniques may train the external actor for three epochs, while the internal actor may be trained for one epoch. The clip ratio in both cases may be 0.1. A generalized advantage estimate may be used for the internal actor, with λ=0.9. In some aspects, the advantage estimate for both the external and internal actors may not be normalized.

Exemplary Network Training and Testing—Computer Game Task

The present techniques may include training an ANN to play a computer game (e.g., Space Invaders). A computer-implemented method may include training a network to play the Atari game Space Invaders. The network may include three modules/layers: a β-variational autoencoder (β-VAE) that encodes the game frames into a compressed representation; a series of feedforward layers that culminate in a policy output and a critic output; and a top-down layer that is trained to bias activity in the feedforward layers in order to maximize reward. As above, the training and operation of ML models (e.g., an ANN, an RNN, etc.) may be performed by one or more modules of the memory 160 of FIG. 1 (e.g., the ML training module 162, the ML operation module 164, and/or other modules).

The β-VAE may be trained in isolation on a data set of game frames collected by an agent choosing random actions. For example, frame skip may be set to 4, frame stacking may be set to 4, frames may be scaled to size 84×84, and pixel values may be scaled between 0 and 1. To simplify dimensions for the β-VAE, the present techniques may include cropping the frames (e.g., to size 80×80). Given the importance of motion for Space Invaders (especially regarding the laser shots), the present techniques may include up-weighting all pixels that appear to be in motion. To estimate motion, the computer implemented method may include subtracting a maximum value from minimum values across 4 stacked frames for each pixel, resulting in a sample weight of 1+9(max−min) and a max sample weight of 10. The method may include converting the images to a binary representation, with pixel values above 35/255 (max=255) set to one, and all other pixels set to zero. Those of ordinary skill in the art will recognize that this threshold captures salient features of game play (the cannon, the lasers, and the alien invaders).

The encoder may include four convolutional layers with the ReLu activation. The kernel sizes may be, for example, 6, 4, 4, and 3. The dimensions, for example, may be 64, 128, 128, 256, and for all layers, the stride may be 2 with "same" padding. The bottleneck layer may be of size 256. These parameters are provided for example, and in some aspects, other or more/fewer parameters may be chosen. Furthermore, for different tasks (e.g., a different motion direction, or another task type altogether), different parameters and network structures may be chosen.

The training data for β-VAE may be collected by an agent choosing random actions. For example, the computer-implemented method may include collecting 50,000 stacked frames, one second of game play apart (i.e., 60 time steps). The method may include adding these frames to horizontally flipped images, and adding those to training data for a total of 100,000 stacked images. The method may use binary cross-entropy for reconstruction loss, weighted by the procedure detailed above, and Kullback-Leibler divergence loss scaled by a 3 term. The β-VAE may be trained for 200 epochs, and the 3 term linearly increased from 0 to 4.

When training the agent to play the game, game frames may be processed in the same manner detailed above, and then encoded in a 256-D compressed representation by the β-VAE encoder. The β-VAE weights may be frozen during this stage of training. This 256-D representation may then be passed through an initializer with a gain of V. The output of each layer may then be added to the projection from the fixed, feedforward layers (e.g., 6 layers of size 1024), with no bias term, and initialized with the Orthogonal top-down layer (as described below), and then the Elu activation may be applied to the sum. These weights may also be frozen during training. The output layer may include a policy output of (e.g., of size 6), which may be determined by the number of possible actions and a critic output of size 1. The critic output may be responsible for predicting the discounted future with a discount factor of γ=0.99. Both the policy and critic may be initialized with an Orthogonal initializer with a gain of 1. The weights and biases of the output layer may be trained.

The top-down layer may be a learned 64-D vector that projects onto each of the feedforward layers. These projection weights may match the size of the feedforward layers (e.g., 1024), and may be initialized with the Orthogonal initializer with a gain of $\sqrt{2}$. While the 64-D top-down signal may be trained, the projection weights may not be trained.

As for the cognitive tasks, the method may include training the network as a system of cooperating agents. The "external" actor may be the output layer, and the "internal" actor may be the 64-D top-down signal. Both may be trained using the PPO algorithm, where the learning rate for the external and internal actors is 2.5x10-4 and 5x10-5, respectively, for example. The time horizon may be a number of time steps (e.g., 128), the batch size may be 64, and training data was be split, e.g., into 4 mini-batches. The external actor may be trained for 3 epochs, while the internal actor is trained for 1 epoch. The clip ratio in both cases may be 0.1. The generalized advantage estimate may be used with λ=0.95. The advantage estimate for the internal, but not the external, actor may be normalized.

ADDITIONAL CONSIDERATIONS

While the present techniques demonstrate that networks with highly limited synaptic plasticity can rapidly learn new tasks in a biologically-plausible manner, further work regarding initialization and robustness is envisioned. The present techniques demonstrate that a given network's initial connectivity is an important determinant of that network's ability to rapidly learn, and that a random search can be used to identify such parameters. It will be appreciated by those of ordinary skill in the art that multiple processes shape the connectivity of neural circuits in the brain—some that are driven stochastically and act over long timescales, like evolution, and others that are more deterministic, like plasticity mechanisms that remodel connectivity during development. It is envisioned that modeling a broader spectrum of these biologically-anchored mechanisms may help encourage proper network connectivity, in a way that provides even further efficiencies. It is also anticipated that looking to biology for inspiration may also ameliorate issues of learning instability. Improving the divisive normalization present in the presently disclosed networks, or adding additional damping mechanisms such as spike rate adaptation are two possible solutions. Finally, several recent studies have proposed additional mechanisms to facilitate biologically-plausible learning, such as adding dendrites to model neurons, and using control theory to properly modulate the feedback onto a network. Integrating these mechanisms may further stabilize learning, and allow the presently disclosed networks to further learn in a biologically-plausible manner.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the aspects herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A computer-implemented method for training one or more artificial neural networks capable of rapidly solving tasks with constrained plasticity, comprising: selecting, via one or more processors, a set of artificial neural network parameters; sampling the network parameters from a uniform distribution with defined ranges; selecting connection weights for one or more artificial neural networks; initializing the one or more artificial neural networks using the network parameters and connection weights; running the artificial neural networks on a series of trials of cognitive tasks; and determining whether activity of each of the artificial neural networks is within an acceptable range.

2. The computer-implemented method of aspect 1, wherein the set of artificial neural network parameters include at least one of: i) a shape of excitatory-to-excitatory weight distribution parameter ($\kappa_{EE}$); ii) a shape of excitatory-to-inhibitory weight distribution parameter ($\kappa_{EI}$); iii) a shape of inhibitory-to-excitatory weight distribution parameter ($\kappa_{IE}$); iv) a shape of inhibitory-to-inhibitory weight distribution parameter ($\kappa_{II}$); v) a shape of topological modifier for excitatory-to-excitatory connectivity parameter ($\lambda_{EE}$); vi) a shape of topological modifier for excitatory-to-inhibitory connectivity parameter ($\lambda_{EI}$); vii) a shape of topological modifier for inhibitory-to-excitatory connectivity parameter ($\lambda_{IE}$); viii) a shape of topological modifier for inhibitory-to-inhibitory connectivity parameter ($\lambda_{II}$); ix) a global strength of recurrent weights parameter ($w_r$); x) a strength of reciprocal connectivity from excitatory to excitatory units parameter ($\alpha_{EE}$); xi) a strength of excitatory-to-inhibitory/inhibitory-to-excitatory reciprocal connectivity parameter ($\alpha_{EI}/\alpha_{IE}$); xii) a strength of inhibitory-to-inhibitory reciprocal connectivity parameter ($\alpha_{II}$); xiii) a shape of bottom-up input weight distribution onto excitatory units parameter ($\kappa_{inp,E}$); xiv) a shape of bottom-up input weight distribution onto inhibitory units parameter ($\lambda_{inp,I}$); xv) a shape of topological modifier for bottom-up input onto excitatory units parameter ($\lambda_{inp,E}$); xvi) a shape of topological modifier for bottom-up input onto inhibitory units parameter ($\lambda_{inp,I}$); xvii) a global strength of bottom-up input weights parameter ($w_{inp}$); xviii) a strength of normalization from excitatory to excitatory units parameter ($\beta_{E,E}$); xix) a strength of normalization from excitatory to inhibitory units parameter ($\beta_{E,I}$); xx) a strength of normalization from inhibitory to excitatory units parameter ($\beta_{I,E}$); xxi) a strength of normalization from inhibitory to inhibitory units parameter ($\beta_{I,I}$); xxii) a time constant of network activity modulation parameter ($T_n$); xxiii) a shape of top-down weight distribution onto excitatory units parameter ($\kappa_{T,D,E}$); xxiv) a shape of topological modifier for top-down input onto excitatory units parameter ($\lambda_{TD,E}$); xxv) a shape of top-down weight distribution onto inhibitory units parameter ($\kappa_{T,D,I}$);); or xxvi) a shape of topological modifier for top-down input onto inhibitory units parameter ($\lambda_{TD,I}$).

3. The computer-implemented method of aspect 1, wherein sampling the network parameters from a uniform distribution with defined ranges includes randomly sampling the network parameters.

4. The computer-implemented method of aspect 1, further comprising: calculating the mean accuracy across the trials of the tasks; and selecting one or more top-performing networks according to the maximum mean accuracy at the end of training.

5. The computer-implemented method of any of aspects 1-4, further comprising: randomly resampling the connection weights using parameters of the identified top-performing networks.

6. The computer-implemented method of any of aspects 1-5, further comprising: retraining one or more additional artificial neural networks, to verify the reliability of the artificial neural network.

7. The computer-implemented method of any of aspects 1-5, further comprising: training one or more additional artificial neural networks, to verify the generalizability of the one or more artificial neural networks.

8. The computer-implemented method of aspect 1, wherein the one more artificial neural networks include at least one of i) a recurrent neural network or ii) a feed-forward neural network.

9. The computer-implemented method of aspect 1, further comprising: training an internal actor to linearly project upon a recurrent layer of at least one of the artificial neural networks; and training an external actor to respond to the external environment of at least one of the artificial neural networks, wherein the internal actor and the external actor enable the at least one artificial neural network to avoid backpropagation of error signals throughout the network and/or across time.

10. A computing system, comprising: one or more processors; and one or more memories having stored thereon computer-executable instructions that, when executed by the one or more processors, cause the computing system to: select, via one or more processors, a set of artificial neural network parameters; sample the network parameters from a uniform distribution with defined ranges; select connection weights for one or more artificial neural networks; initialize the one or more artificial neural networks using the network parameters and connection weights; run the artificial neural networks on a series of trials of cognitive tasks; and determine whether activity of each of the artificial neural networks is within an acceptable range.

11. The computing system of aspect 10, the one or more memories having stored thereon computer-executable instructions that, when executed by the one or more processors, cause the computing system to: randomly sample the network parameters.

12. The computing system of aspect 10, the one or more memories having stored thereon computer-executable instructions that, when executed by the one or more processors, cause the computing system to: calculate the mean accuracy across the trials of the tasks; and select the top-performing networks according to the maximum mean accuracy at the end of training.

13. The computing system of any of aspects 10-12, the one or more memories having stored thereon computer-executable instructions that, when executed by the one or more processors, cause the computing system to: randomly resample the connection weights using parameters of the identified top-performing networks.

14. The computing system of any of aspects 10-13, the one or more memories having stored thereon computer-executable instructions that, when executed by the one or more processors, cause the computing system to: retrain one or more additional artificial neural networks, to verify the reliability of the artificial neural network.

15. The computing system of any of aspects 10-13, the one or more memories having stored thereon computer-executable instructions that, when executed by the one or more processors, cause the computing system to: train one or more additional artificial neural networks, to verify the generalizability of the artificial neural network.

16. The computing system of aspect 10, the one or more memories having stored thereon computer-executable instructions that, when executed by the one or more processors, cause the computing system to: train an internal actor to linearly project upon a recurrent layer of at least one of the artificial neural networks; and train an external actor to respond to the external environment of at least one of the artificial neural networks, wherein the internal actor and the external actor enable the at least one artificial neural network to avoid backpropagation of error signals throughout the network and/or across time.

17. A non-transitory computer-readable medium containing program instructions that when executed, cause a computer to: select, via one or more processors, a set of artificial neural network parameters; sample the network parameters from a uniform distribution with defined ranges; select connection weights for one or more artificial neural networks; initialize the one or more artificial neural networks using the network parameters and connection weights; run the artificial neural networks on a series of trials of cognitive tasks; and determine whether activity of each of the artificial neural networks is within an acceptable range.

18. The non-transitory computer-readable medium of aspect 17, containing further program instructions that when executed, cause a computer to: randomly sample the network parameters.

19. The non-transitory computer-readable medium of aspect 17, containing further program instructions that when executed, cause a computer to: calculate the mean accuracy across the trials of the tasks; and select the top-performing networks according to the maximum mean accuracy at the end of training.

20. The non-transitory computer-readable medium of aspect 17, containing further program instructions that when executed, cause a computer to: train an internal actor to linearly project upon a recurrent layer of at least one of the artificial neural networks; and train an external actor to respond to the external environment of at least one of the artificial neural networks, wherein the internal actor and the external actor enable the at least one artificial neural network to avoid backpropagation of error signals throughout the network and/or across time.

What is claimed:

1. A computer-implemented method for training one or more artificial neural networks capable of rapidly solving tasks with constrained plasticity, comprising:

selecting, via one or more processors, a set of artificial neural network parameters;

randomly sampling the network parameters from a uniform distribution with defined ranges;

selecting connection weights for one or more artificial neural networks, wherein the set of artificial neural network parameters includes at least one parameter that defines at least one of a weight-distribution shape, a topology modifier, a recurrent weight strength, or a normalization strength for a recurrent layer of excitatory and inhibitory neurons;

initializing the one or more artificial neural networks using the network parameters and connection weights;

running the artificial neural networks on a series of trials of cognitive tasks; and determining whether activity of each of the artificial neural networks is within an acceptable range.

2. The computer-implemented method of claim 1, wherein the set of artificial neural network parameters include at least one of:

i) a shape of excitatory-to-excitatory weight distribution parameter ($K_{EE}$);
ii) a shape of excitatory-to-inhibitory weight distribution parameter ($K_{EI}$);
iii) a shape of inhibitory-to-excitatory weight distribution parameter ($K_{IE}$);
iv) a shape of inhibitory-to-inhibitory weight distribution parameter ($K_{II}$);
v) a shape of topological modifier for excitatory-to-excitatory connectivity parameter ($\lambda_{EE}$);
vi) a shape of topological modifier for excitatory-to-inhibitory connectivity parameter ($\lambda_{EI}$);
vii) a shape of topological modifier for inhibitory-to-excitatory connectivity parameter ($\lambda_{IE}$);
viii) a shape of topological modifier for inhibitory-to-inhibitory connectivity parameter ($\lambda_{II}$);
ix) a global strength of recurrent weights parameter ($w_r$);
x) a strength of reciprocal connectivity from excitatory to excitatory units parameter ($\alpha_{EE}$);
xi) a strength of excitatory-to-inhibitory/inhibitory-to-excitatory reciprocal connectivity parameter ($a_{EI}/\alpha_{IE}$);
xii) a strength of inhibitory-to-inhibitory reciprocal connectivity parameter ($\alpha_{II}$);
xiii) a shape of bottom-up input weight distribution onto excitatory units parameter ($K_{inp,E}$);
xiv) a shape of bottom-up input weight distribution onto inhibitory units parameter ($K_{inp,I}$);
xv) a shape of topological modifier for bottom-up input onto excitatory units parameter ($\lambda_{inp,E}$);
xvi) a shape of topological modifier for bottom-up input onto inhibitory units parameter ($\lambda_{inp,I}$);
xvii) a global strength of bottom-up input weights parameter ($w_{inp}$);
xviii) a strength of normalization from excitatory to excitatory units parameter ($\beta_{E,E}$);
xix) a strength of normalization from excitatory to inhibitory units parameter ($\beta_{E,I}$);
xx) a strength of normalization from inhibitory to excitatory units parameter ($\beta_{I,E}$);
xxi) a strength of normalization from inhibitory to inhibitory units parameter ($\beta_{I,I}$);
xxii) a time constant of network activity modulation parameter ($T_n$);
xxiii) a shape of top-down weight distribution onto excitatory units parameter ($\kappa_{T,D,E}$);
xxiv) a shape of topological modifier for top-down input onto excitatory units parameter ($\lambda_{TD,E}$);
xxv) a shape of top-down weight distribution onto inhibitory units parameter ($\kappa_{T,D,I}$);); or
xxvi) a shape of topological modifier for top-down input onto inhibitory units parameter ($\lambda_{TD,I}$.

3. The computer-implemented method of claim 1, wherein sampling the network parameters from a uniform distribution with defined ranges includes randomly sampling the network parameters.

4. The computer-implemented method of claim 1, further comprising:

calculating the mean accuracy across the trials of the tasks; and
selecting one or more top-performing networks according to the maximum mean accuracy at the end of training.

5. The computer-implemented method of claim 4, further comprising:

randomly resampling the connection weights using parameters of the identified top-performing networks.

6. The computer-implemented method of claim 5, further comprising:

retraining one or more additional artificial neural networks, to verify the reliability of the artificial neural network.

7. The computer-implemented method of claim 5, further comprising:

training one or more additional artificial neural networks, to verify the generalizability of the one or more artificial neural networks.

8. The computer-implemented method of claim 1, wherein the one more artificial neural networks include at least one of i) a recurrent neural network or ii) a feed-forward neural network.

9. The computer-implemented method of claim 1, further comprising:

training an internal actor to linearly project upon a recurrent layer of at least one of the artificial neural networks; and
training an external actor to respond to the external environment of at least one of the artificial neural networks,
wherein the internal actor and the external actor enable the at least one artificial neural network to avoid backpropagation of error signals throughout the network and/or across time.

10. A computing system, comprising:

one or more processors; and
one or more memories having stored thereon computer-executable instructions that, when executed by the one or more processors, cause the computing system to:
select, via one or more processors, a set of artificial neural network parameters;
randomly sample the network parameters from a uniform distribution with defined ranges;
select connection weights for one or more artificial neural networks,
wherein the set of artificial neural network parameters includes at least one parameter that defines at least one of a weight-distribution shape, a topology modifier, a recurrent weight strength, or a normalization strength for a recurrent layer of excitatory and inhibitory neurons;
initialize the one or more artificial neural networks using the network parameters and connection weights;
run the artificial neural networks on a series of trials of cognitive tasks; and
determine whether activity of each of the artificial neural networks is within an acceptable range.

11. The computing system of claim 10, the one or more memories having stored thereon computer-executable instructions that, when executed by the one or more processors, cause the computing system to:

calculate the mean accuracy across the trials of the tasks; and
select the top-performing networks according to the maximum mean accuracy at the end of training.

12. The computing system of claim 11, the one or more memories having stored thereon computer-executable instructions that, when executed by the one or more processors, cause the computing system to:

randomly resample the connection weights using parameters of the identified top-performing networks.

13. The computing system of claim 12, the one or more memories having stored thereon computer-executable instructions that, when executed by the one or more processors, cause the computing system to:

retrain one or more additional artificial neural networks, to verify the reliability of the artificial neural network.

14. The computing system of claim 12, the one or more memories having stored thereon computer-executable instructions that, when executed by the one or more processors, cause the computing system to:

train one or more additional artificial neural networks, to verify the generalizability of the artificial neural network.

15. The computing system of claim 10, the one or more memories having stored thereon computer-executable instructions that, when executed by the one or more processors, cause the computing system to:

train an internal actor to linearly project upon a recurrent layer of at least one of the artificial neural networks; and train an external actor to respond to the external environment of at least one of the artificial neural networks, wherein the internal actor and the external actor enable the at least one artificial neural network to avoid backpropagation of error signals throughout the network and/or across time.

16. A non-transitory computer-readable medium containing program instructions that when executed, cause a computer to:

select, via one or more processors, a set of artificial neural network parameters;

randomly sample the network parameters from a uniform distribution with defined ranges;

select connection weights for one or more artificial neural networks, wherein the set of artificial neural network parameters includes at least one parameter that defines at least one of a weight-distribution shape, a topology modifier, a recurrent weight strength, or a normalization strength for a recurrent layer of excitatory and inhibitory neurons;

initialize the one or more artificial neural networks using the network parameters and connection weights;

run the artificial neural networks on a series of trials of cognitive tasks; and determine whether activity of each of the artificial neural networks is within an acceptable range.

17. The non-transitory computer-readable medium of claim 16, containing further program instructions that when executed, cause a computer to:

calculate the mean accuracy across the trials of the tasks; and select the top-performing networks according to the maximum mean accuracy at the end of training.

18. The non-transitory computer-readable medium of claim 16, containing further program instructions that when executed, cause a computer to:

train an internal actor to linearly project upon a recurrent layer of at least one of the artificial neural networks; and train an external actor to respond to the external environment of at least one of the artificial neural networks, wherein the internal actor and the external actor enable the at least one artificial neural network to avoid backpropagation of error signals throughout the network and/or across time.

* * * * *